US012681896B2

(12) United States Patent　　　　　(10) Patent No.: US 12,681,896 B2
Coffman et al.　　　　　　　　　　　(45) Date of Patent: Jul. 14, 2026

(54) DEVICE, METHOD, AND GRAPHICAL USER INTERFACE FOR MIGRATING DATA TO A FIRST DEVICE DURING A NEW DEVICE SET-UP WORKFLOW

(71) Applicant: Apple Inc., Cupertino, CA (US)

(72) Inventors: Patrick Lee Coffman, San Francisco, CA (US); Robert Garcia, III, San Francisco, CA (US); Donald W. Pitschel, San Francisco, CA (US); Aaron M. Melim, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 834 days.

(21) Appl. No.: 16/868,844

(22) Filed: May 7, 2020

(65) Prior Publication Data

US 2020/0379946 A1　　Dec. 3, 2020

Related U.S. Application Data

(60) Provisional application No. 62/854,708, filed on May 30, 2019.

(51) Int. Cl.
　　*G06F 16/11*　　　(2019.01)
　　*G06F 3/06*　　　　(2006.01)
　　*H04L 67/06*　　　(2022.01)
(52) U.S. Cl.
　　CPC .......... *G06F 16/119* (2019.01); *G06F 3/0647* (2013.01); *G06F 3/0652* (2013.01); *H04L 67/06* (2013.01)

(58) Field of Classification Search
　　CPC .... G06F 16/119; G06F 3/0647; G06F 3/0652; G06F 3/0605; G06F 3/0646; G06F 3/0683; G06F 21/44; H04L 67/06; H04W 4/023
　　See application file for complete search history.

(56) References Cited

U.S. PATENT DOCUMENTS

| | | | | |
|---|---|---|---|---|
| 9,848,061 | B1* | 12/2017 | Jain | H04L 67/01 |
| 2001/0029520 | A1* | 10/2001 | Miyazaki | H04L 67/06 709/200 |
| 2006/0112427 | A1* | 5/2006 | Shahbazi | H04W 12/086 726/16 |
| 2008/0281942 | A1* | 11/2008 | Nakahara | H04L 67/59 709/218 |

(Continued)

*Primary Examiner* — Ajay M Bhatia

(74) *Attorney, Agent, or Firm* — Fernando & Partners, LLP

(57) ABSTRACT

A method includes: detecting, via the one or more input devices, a first input that corresponds to migrating data to set-up the first device during a new device set-up workflow; and, in response to detecting the first input, displaying, via the display device, a data migration user interface that includes concurrently displaying: a selectable direct transfer option that corresponds to initiating a direct transfer of the data to the first device from a second device within a predefined proximity range of the first device, wherein the selectable direct transfer option includes an estimated time for completion of the direct transfer; and a selectable remote transfer option that corresponds to initiating a remote transfer of the data to the first device from a remote storage device, wherein the selectable remote transfer option includes an estimated time for completion of the remote transfer.

22 Claims, 22 Drawing Sheets

New Device 502

Old Device 504

(56) References Cited

U.S. PATENT DOCUMENTS

| 2009/0132400 | A1* | 5/2009 | Conway ................. G06Q 30/04 |
| | | | 705/34 |
| 2015/0163302 | A1* | 6/2015 | Armstrong .......... H04L 67/1097 |
| | | | 709/217 |
| 2016/0277891 | A1* | 9/2016 | Dvortsov ................ H04W 4/12 |
| 2018/0158256 | A1* | 6/2018 | de Sá Miranda ...... G06Q 10/00 |

* cited by examiner

Event Sorter
170

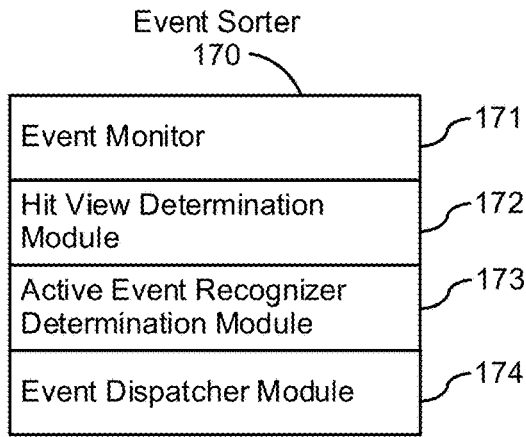

Event Monitor     ⌐171

Hit View Determination Module     ⌐172

Active Event Recognizer Determination Module     ⌐173

Event Dispatcher Module     ⌐174

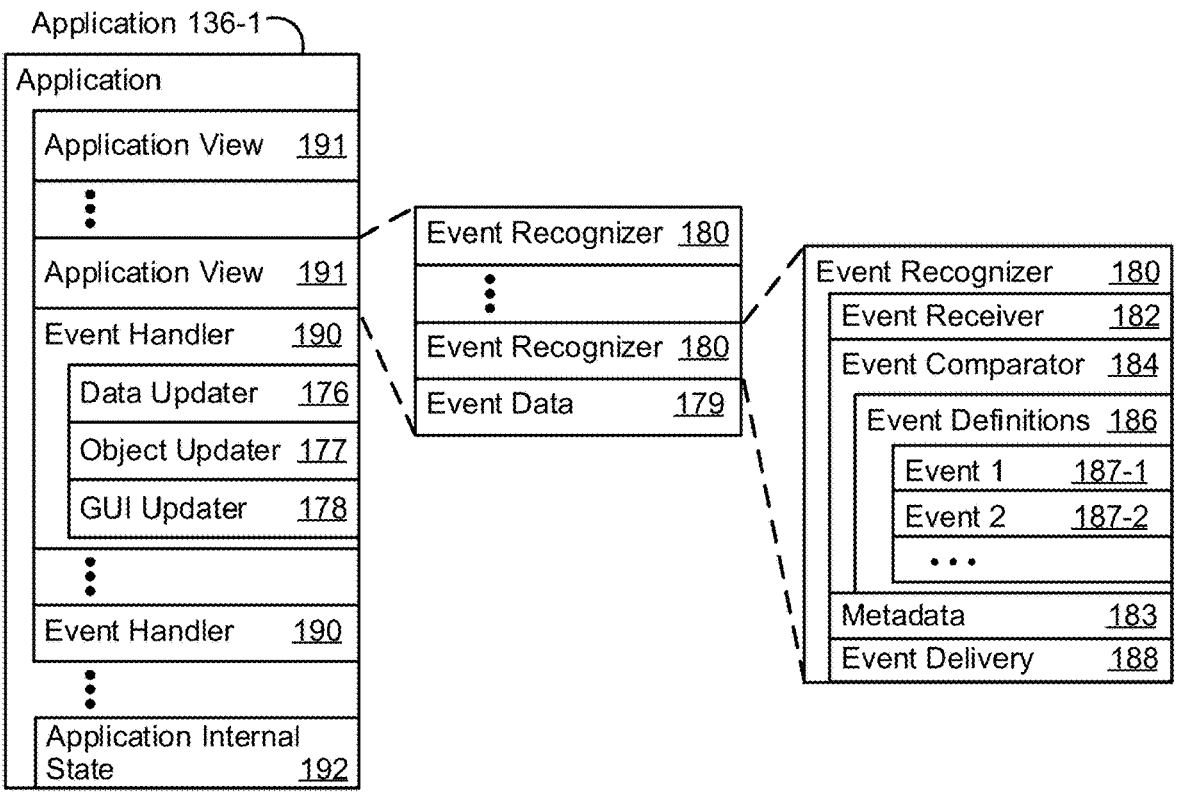

Application 136-1

Application

Application View     191

⋮

Application View     191

Event Handler     190

Data Updater     176

Object Updater     177

GUI Updater     178

⋮

Event Handler     190

⋮

Application Internal State     192

Event Recognizer     180

⋮

Event Recognizer     180

Event Data     179

Event Recognizer     180

Event Receiver     182

Event Comparator     184

Event Definitions     186

Event 1     187-1

Event 2     187-2

• • •

Metadata     183

Event Delivery     188

Figure 1B

Portable Multifunction Device 100

| 206 | 210 | 212 |

Speaker 111

Optical Sensor(s) 164

Proximity Sensor(s) 166

208  200

210 is SIM card slot
212 is headphone jack

202

Touch-Sensitive Display 112

Contact Intensity Sensor(s) 165

Tactile Output Generator(s) 163

203

Microphone 113

Home 204

Accelerometer(s) 168

External Port 124

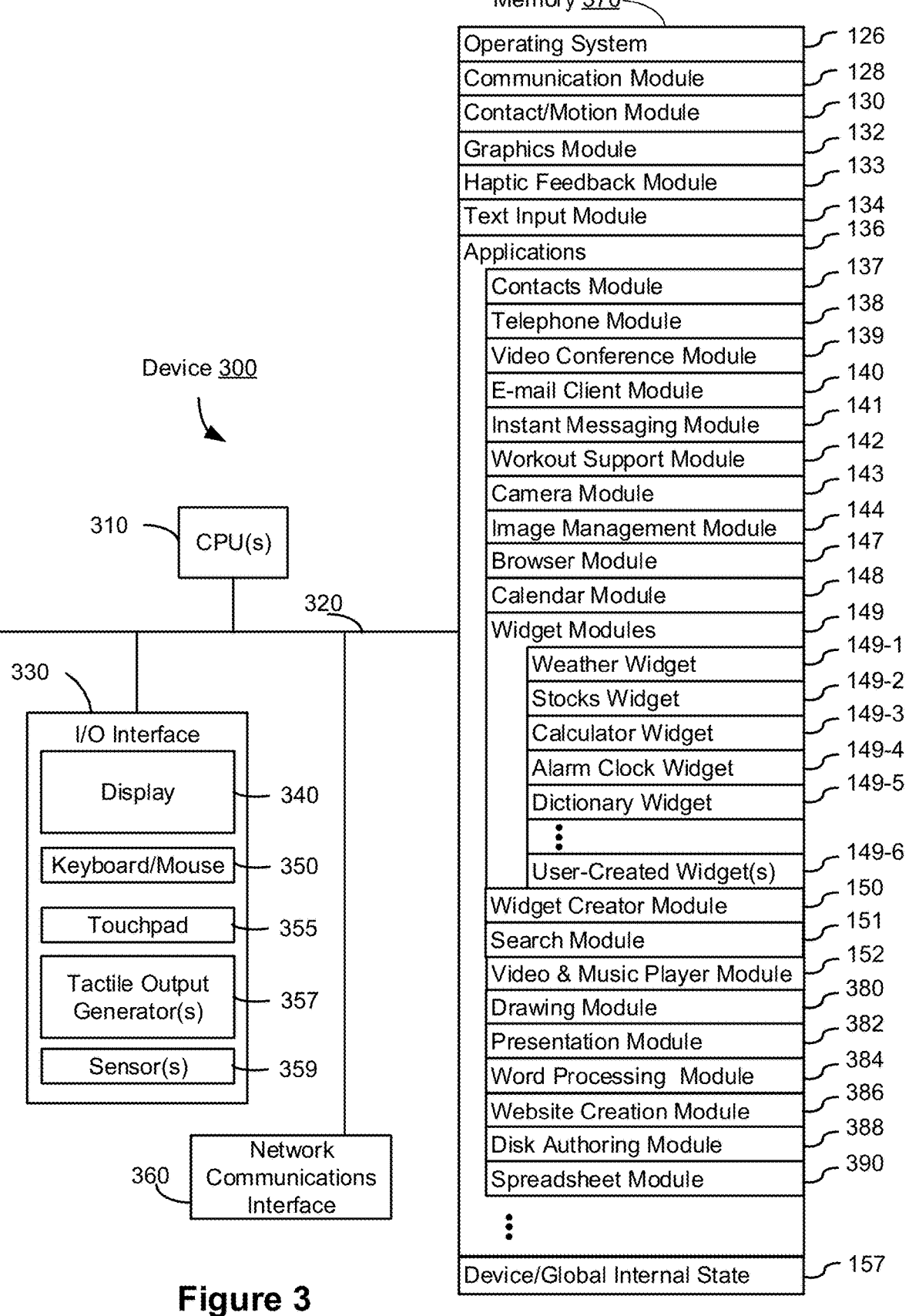

Memory 370

| | |
|---|---|
| Operating System | 126 |
| Communication Module | 128 |
| Contact/Motion Module | 130 |
| Graphics Module | 132 |
| Haptic Feedback Module | 133 |
| Text Input Module | 134 |
| Applications | 136 |
|   Contacts Module | 137 |
|   Telephone Module | 138 |
|   Video Conference Module | 139 |
|   E-mail Client Module | 140 |
|   Instant Messaging Module | 141 |
|   Workout Support Module | 142 |
|   Camera Module | 143 |
|   Image Management Module | 144 |
|   Browser Module | 147 |
|   Calendar Module | 148 |
|   Widget Modules | 149 |
|     Weather Widget | 149-1 |
|     Stocks Widget | 149-2 |
|     Calculator Widget | 149-3 |
|     Alarm Clock Widget | 149-4 |
|     Dictionary Widget | 149-5 |
|     User-Created Widget(s) | 149-6 |
|   Widget Creator Module | 150 |
|   Search Module | 151 |
|   Video & Music Player Module | 152 |
|   Drawing Module | 380 |
|   Presentation Module | 382 |
|   Word Processing Module | 384 |
|   Website Creation Module | 386 |
|   Disk Authoring Module | 388 |
|   Spreadsheet Module | 390 |
| Device/Global Internal State | 157 |

Device 300

310 — CPU(s)

320

330 — I/O Interface
- Display — 340
- Keyboard/Mouse — 350
- Touchpad — 355
- Tactile Output Generator(s) — 357
- Sensor(s) — 359

360 — Network Communications Interface

Figure 3

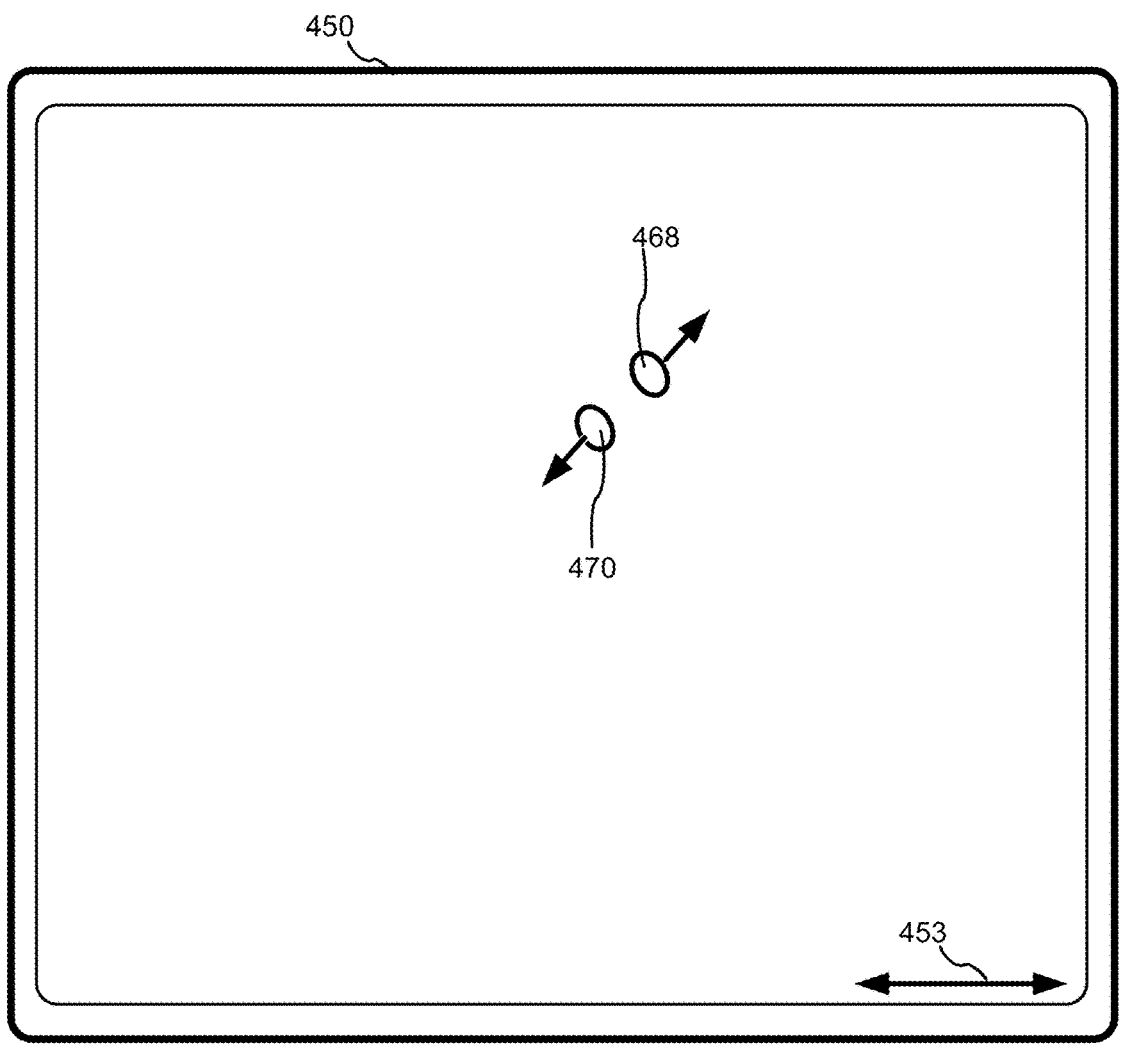
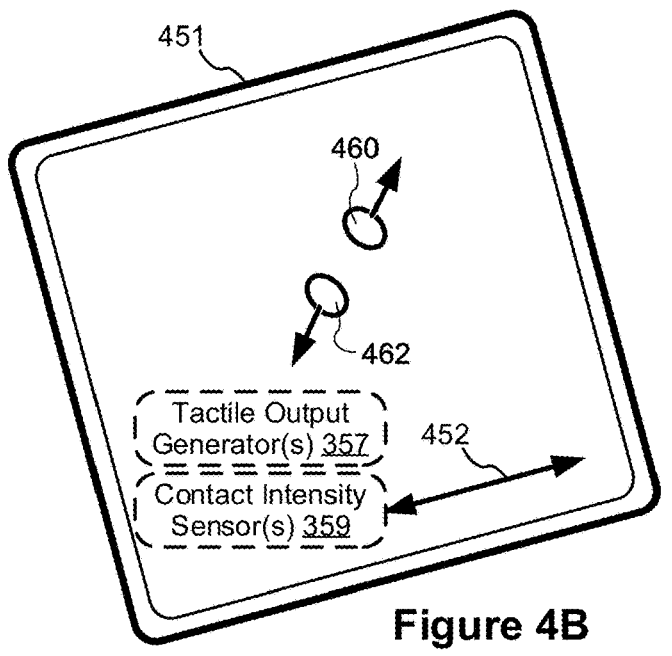
Figure 4B

Old Device 504
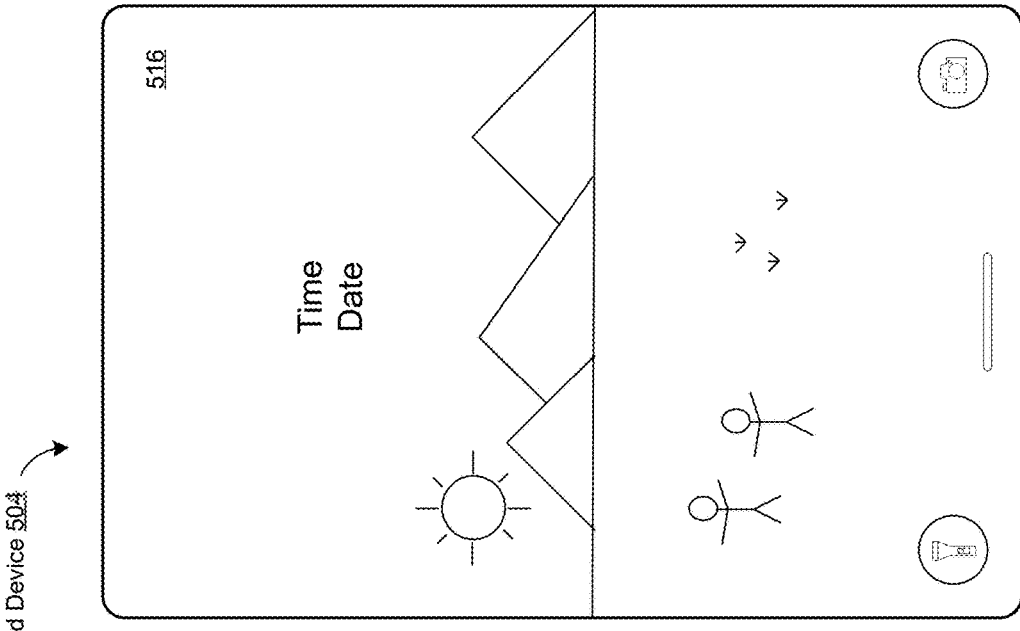
516
Time
Date
New Device 502
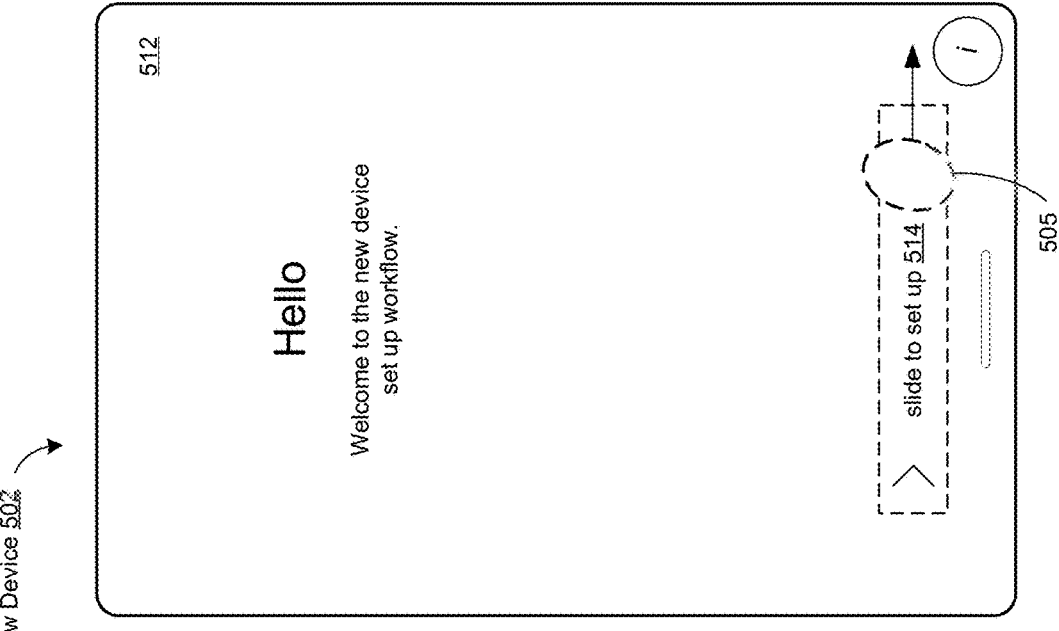
512
Hello
Welcome to the new device
set up workflow.
slide to set up 514
505
Figure 5A Old Device 504
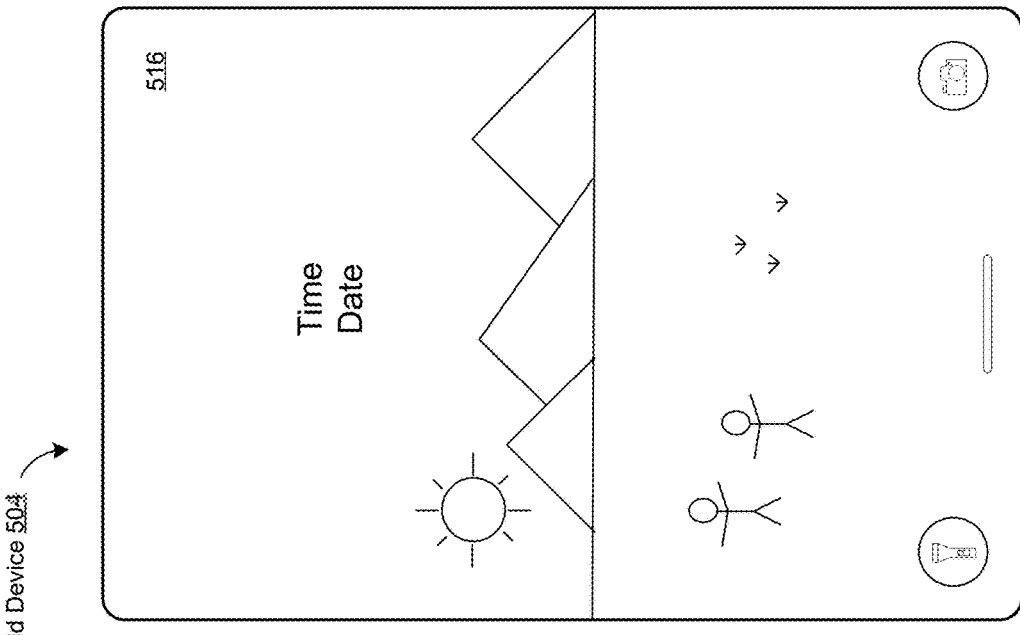
516
Time
Date
New Device 502
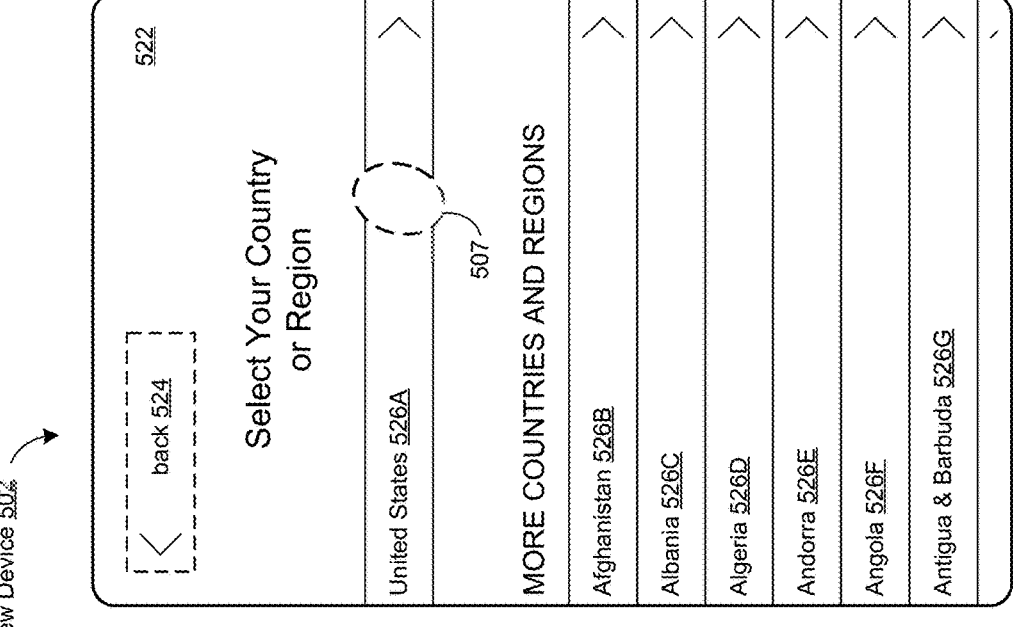
522
back 524
Select Your Country
or Region
507
United States 526A
MORE COUNTRIES AND REGIONS
Afghanistan 526B
Albania 526C
Algeria 526D
Andorra 526E
Angola 526F
Antigua & Barbuda 526G
Figure 5B

Old Device 504
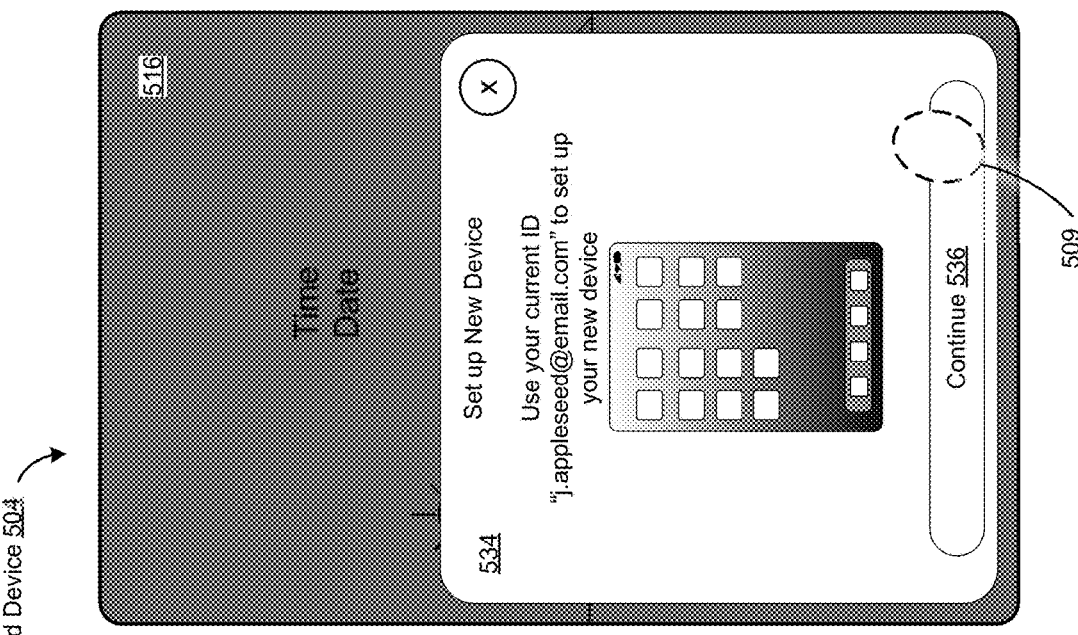
509
New Device 502
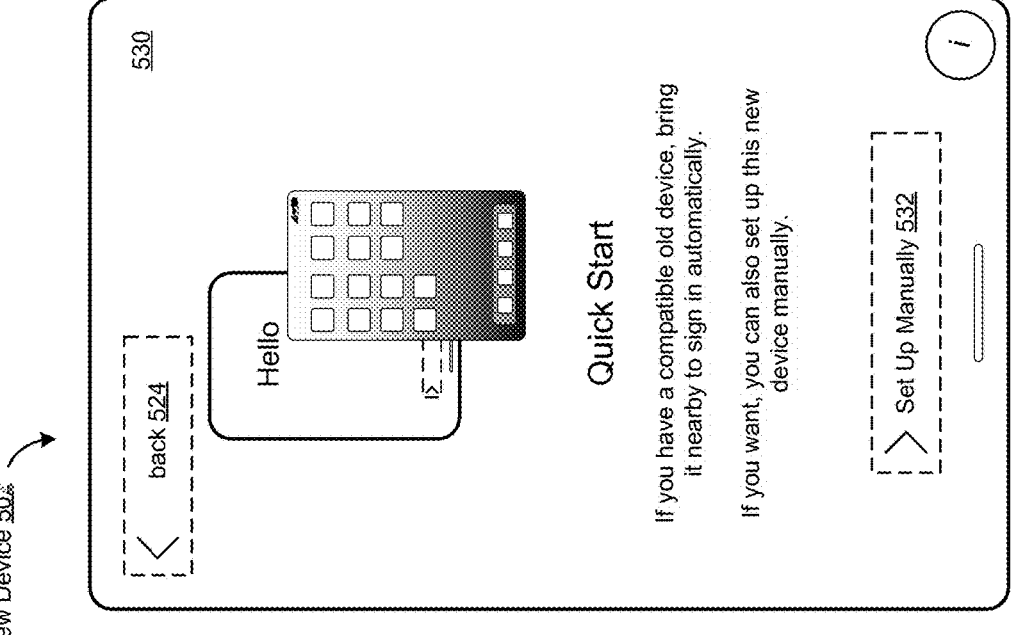
Figure 5C

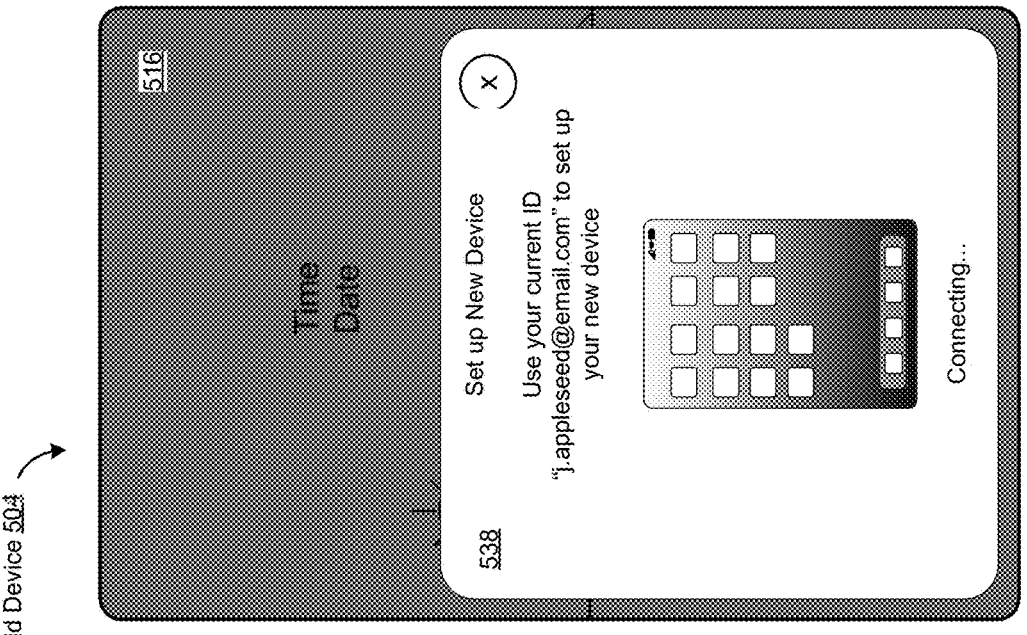
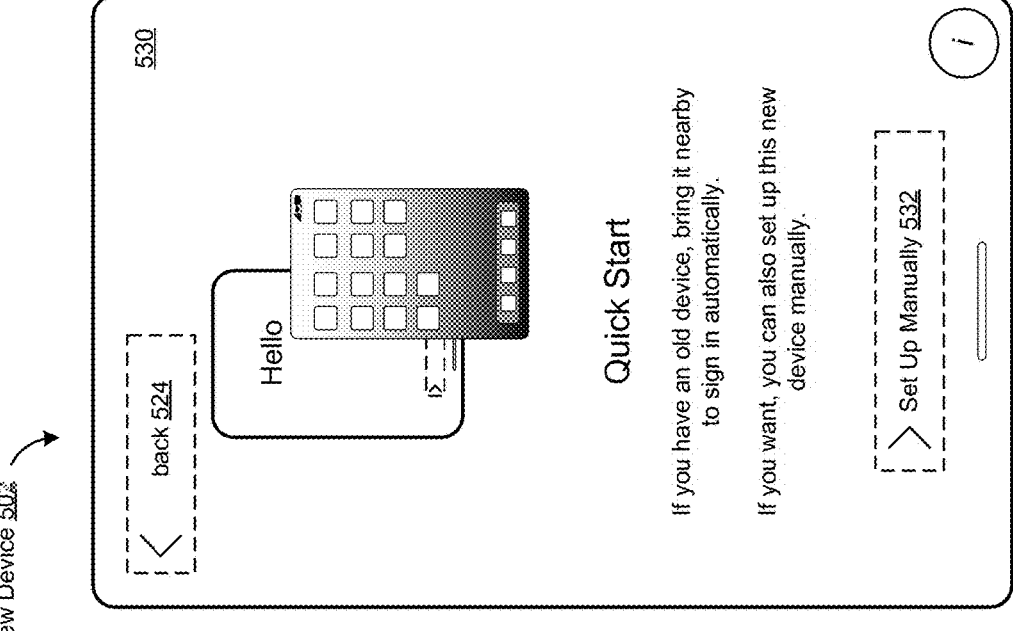
Figure 5D

Old Device 504
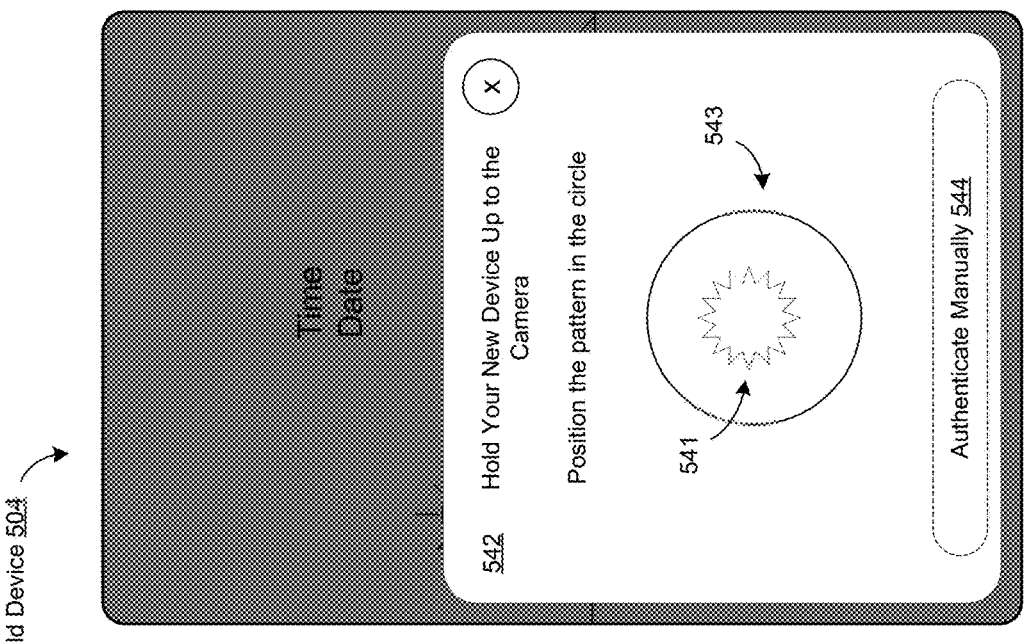
New Device 502
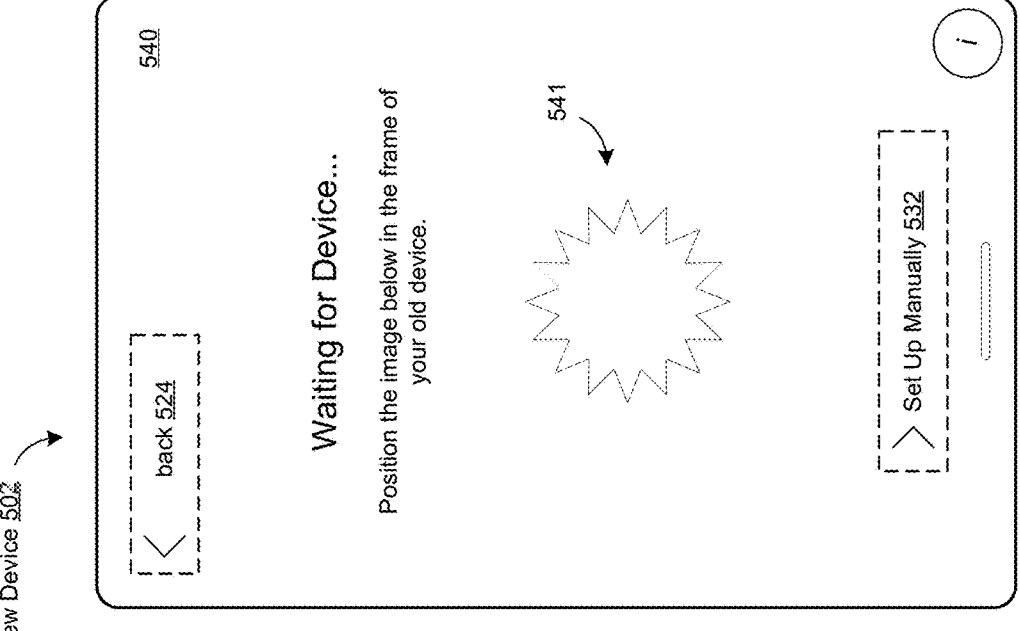
Figure 5E

Old Device 504
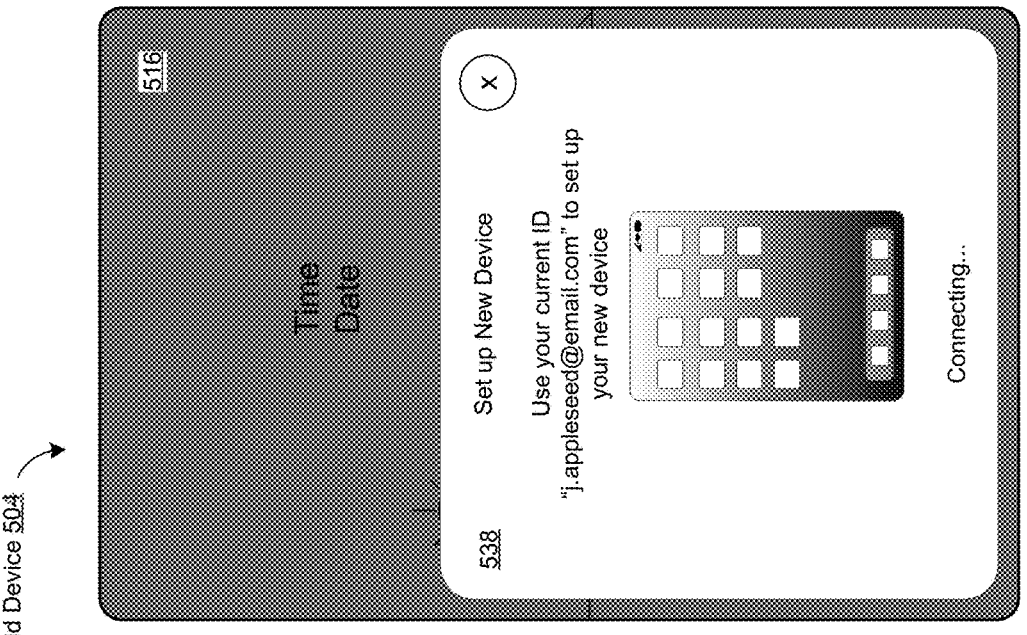
New Device 502
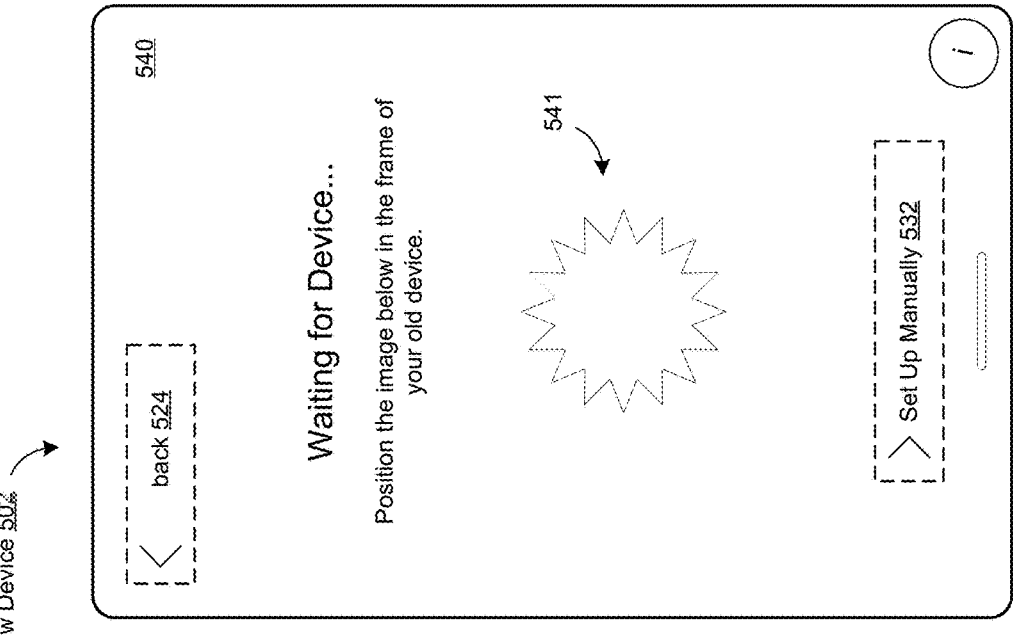
Figure 5F

Old Device 504
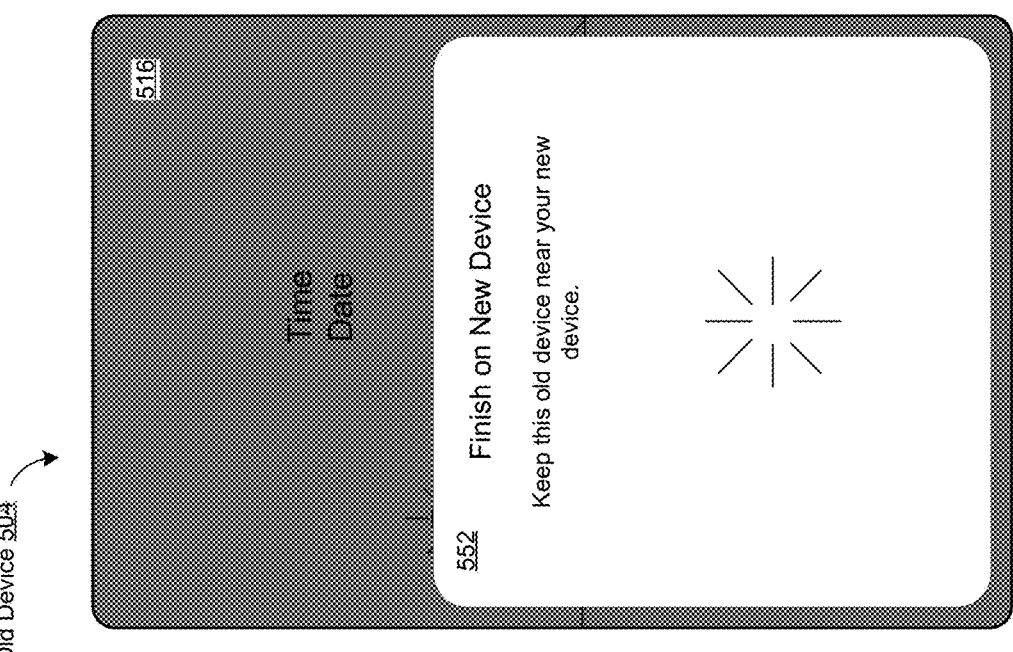
New Device 502
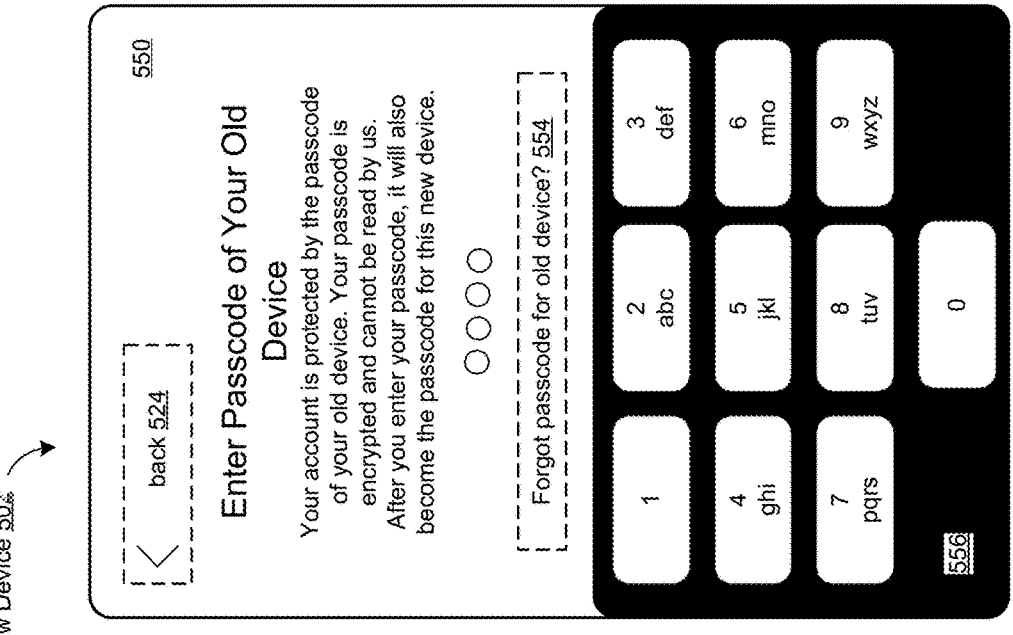
Figure 5G

Old Device 504
516
Time
Date
New Device 502
560
back 524
Transfer Data to New Device
Estimated Time: 40 minutes
Start Transfer 562
521
Other Options 564
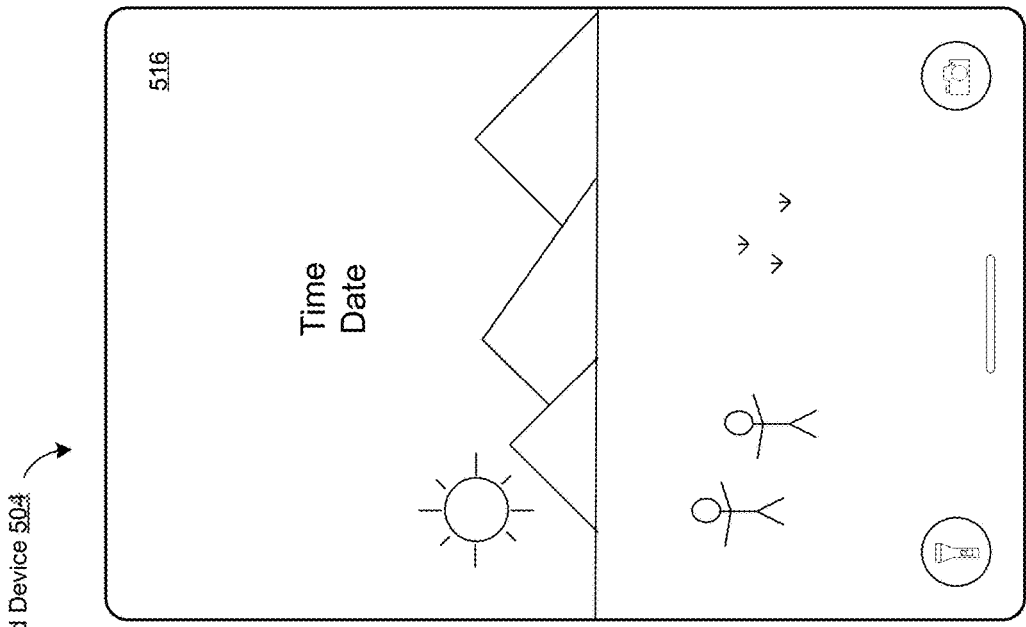
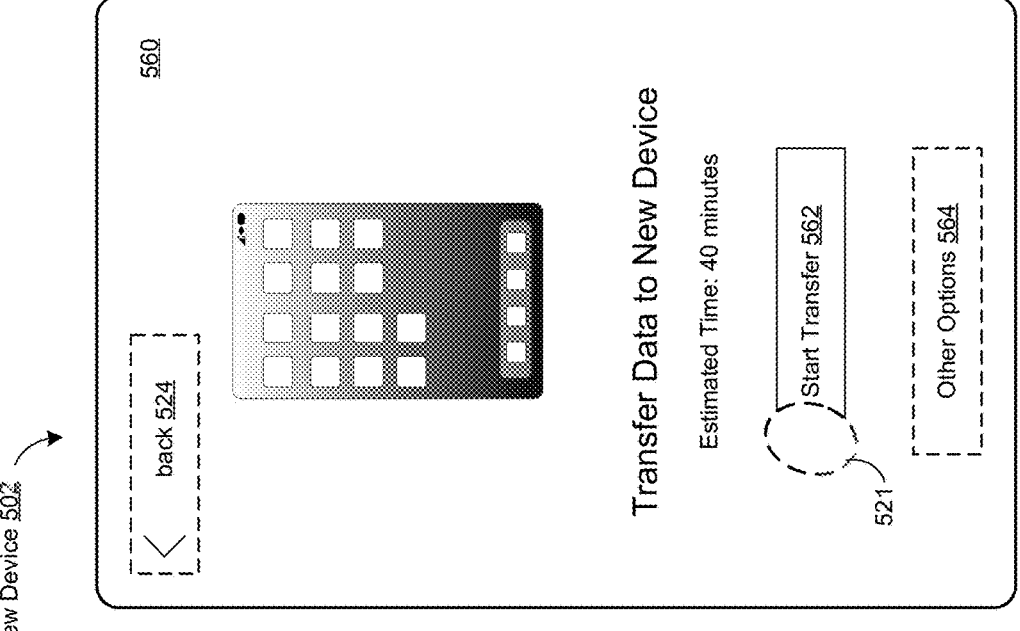
Figure 5H

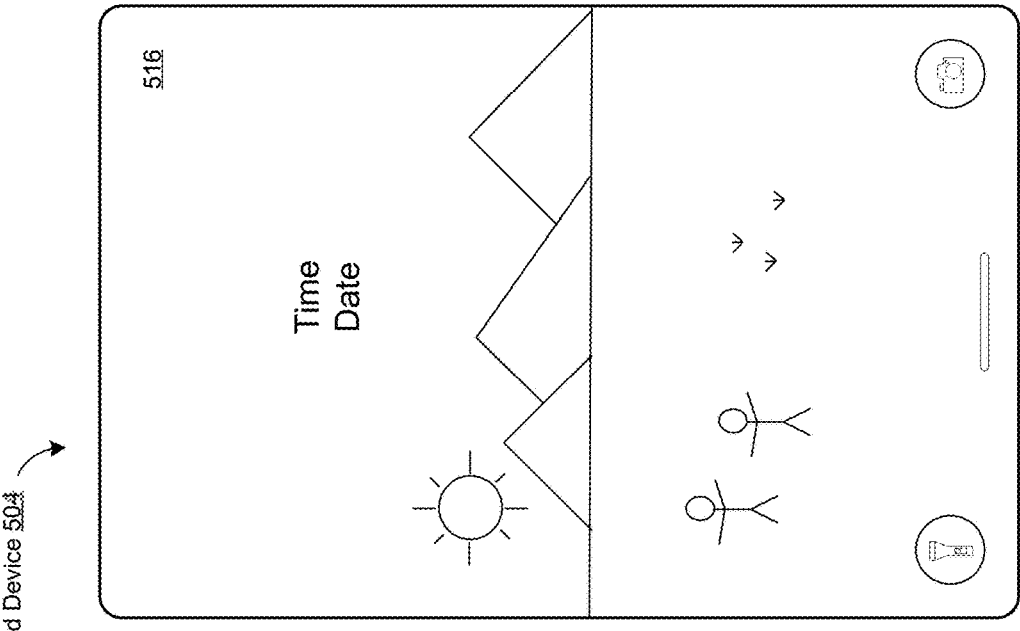
Old Device 504
516
Time
Date
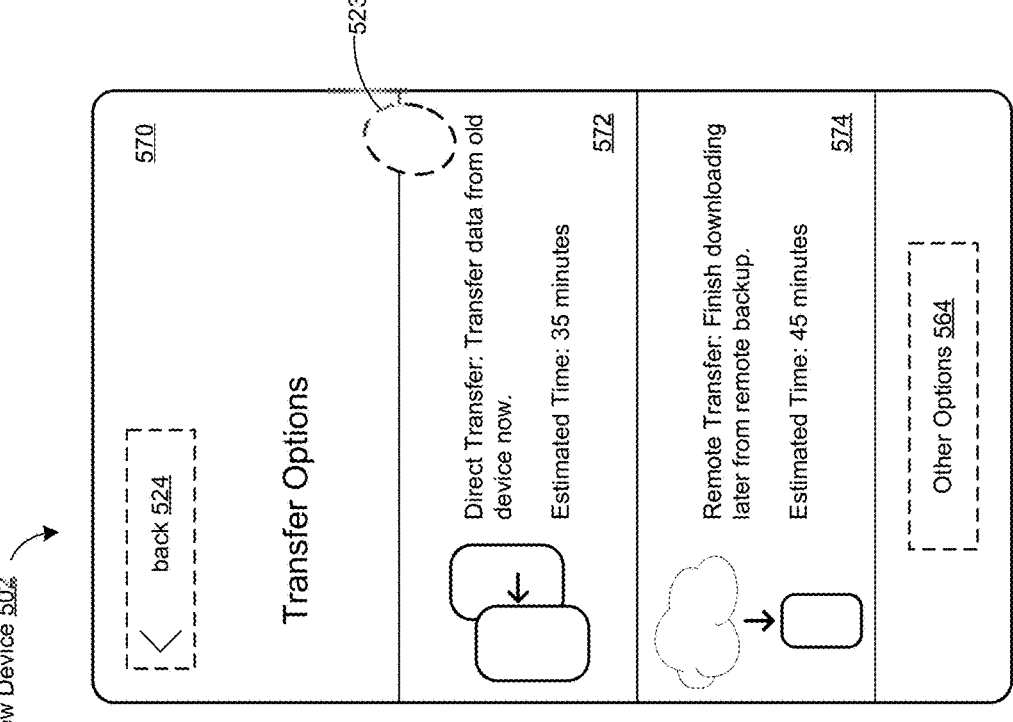
New Device 502
570
back 524
Transfer Options
523
Direct Transfer: Transfer data from old device now.
Estimated Time: 35 minutes
572
Remote Transfer: Finish downloading later from remote backup.
Estimated Time: 45 minutes
574
Other Options 564
Figure 5I

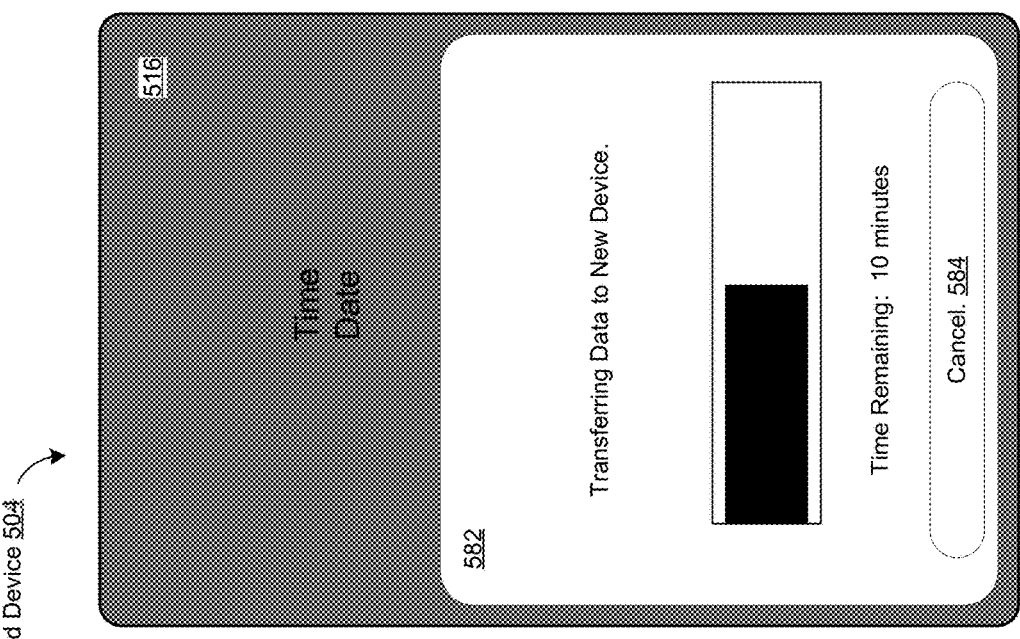
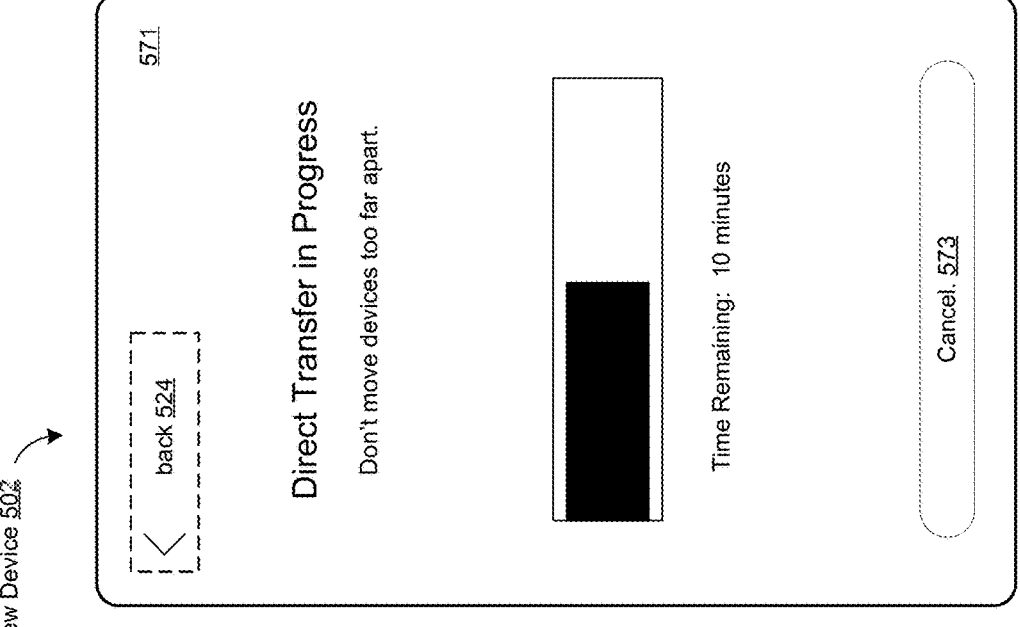
Figure 5J

Old Device 504
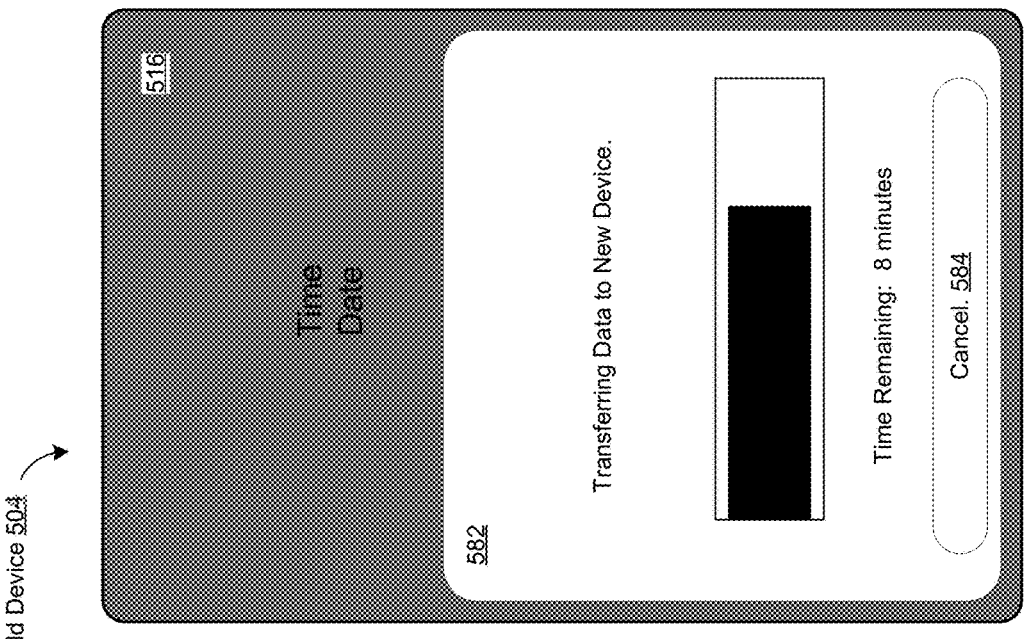
New Device 502
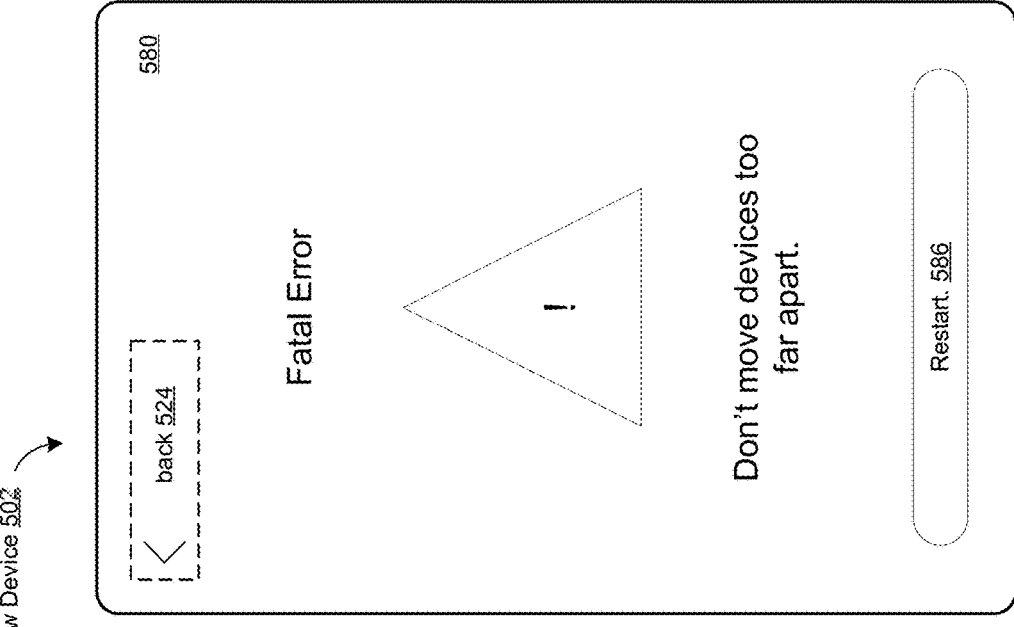
Figure 5K

Old Device 504

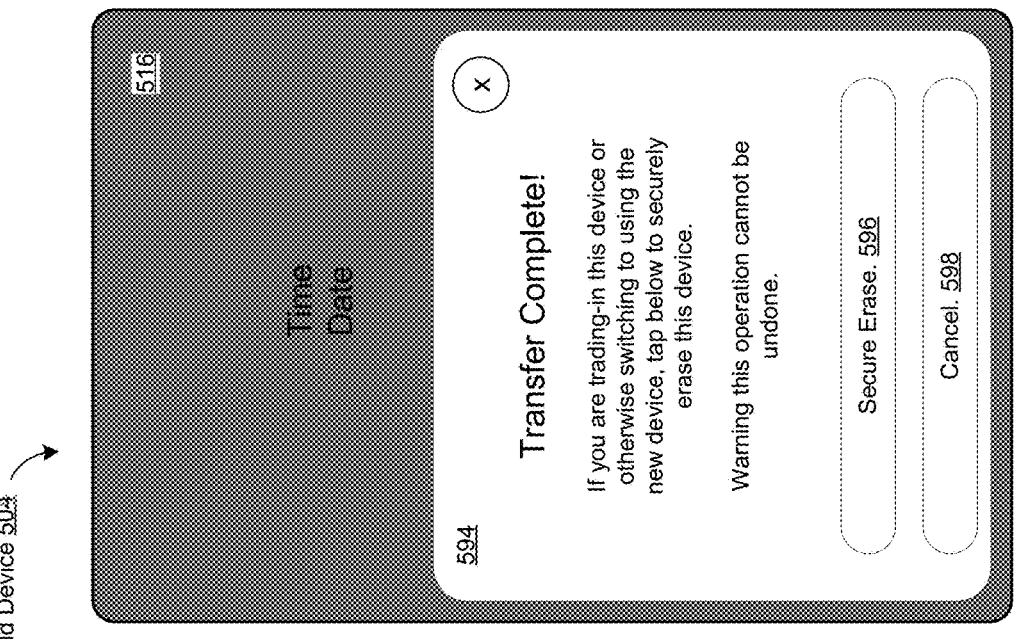

Time
Date

516

594

Transfer Complete!

If you are trading-in this device or otherwise switching to using the new device, tap below to securely erase this device.

Warning this operation cannot be undone.

Secure Erase. 596

Cancel. 598

New Device 502

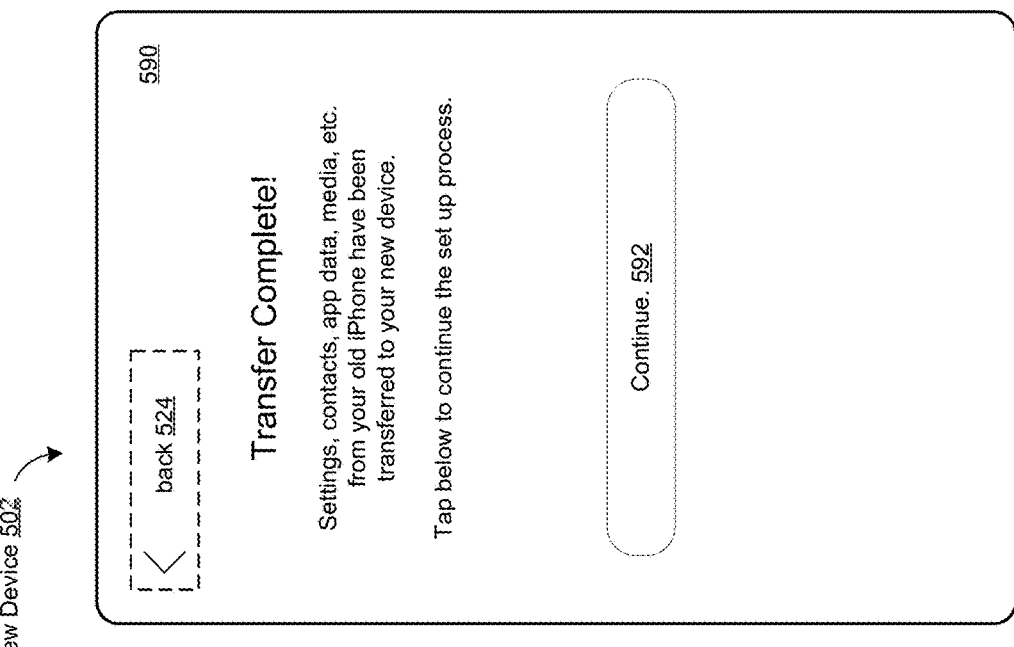

590 back 524

Transfer Complete!

Settings, contacts, app data, media, etc. from your old iPhone have been transferred to your new device.

Tap below to continue the set up process.

Old Device 504
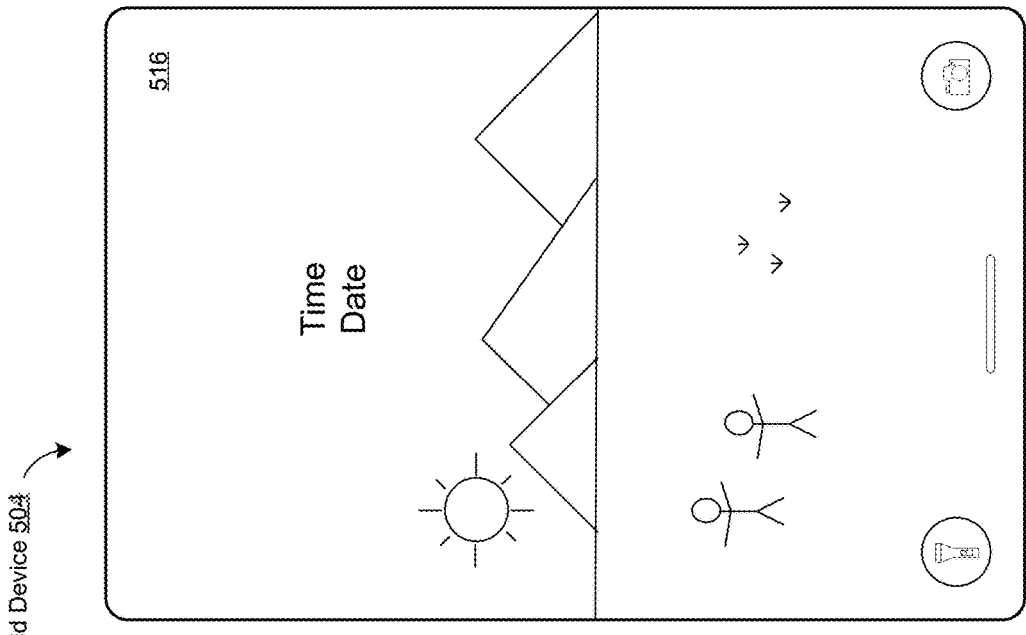
516
Time
Date
New Device 502
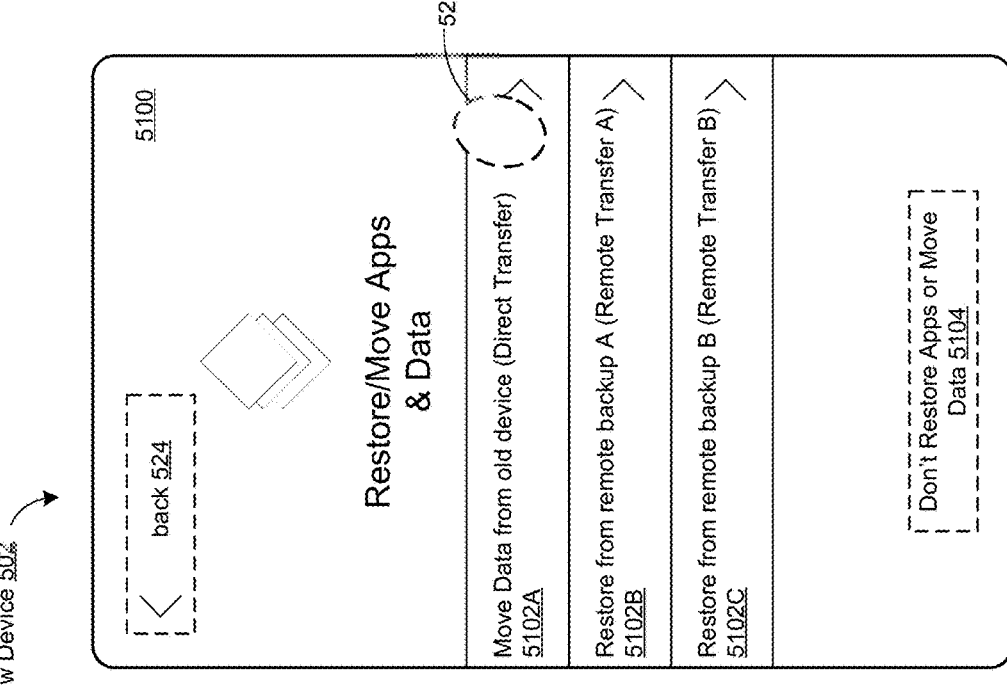
5100
back 524
Restore/Move Apps
& Data
525
Move Data from old device (Direct Transfer)
5102A
Restore from remote backup A (Remote Transfer A)
5102B
Restore from remote backup B (Remote Transfer B)
5102C
Don't Restore Apps or Move
Data 5104
Figure 5M Old Device 504
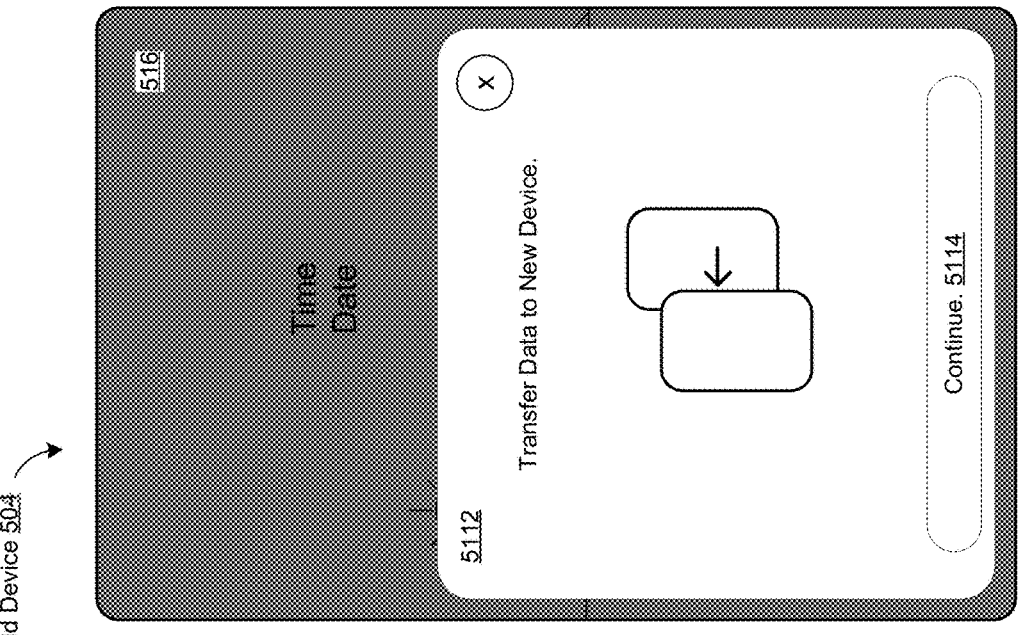
New Device 502
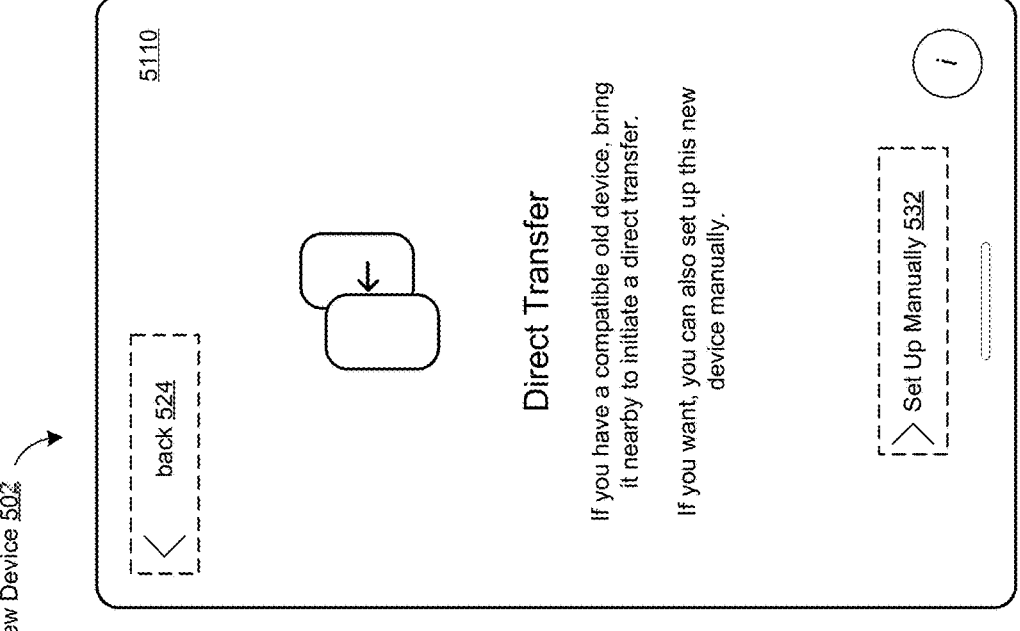
Figure 5N

Figure 6A:
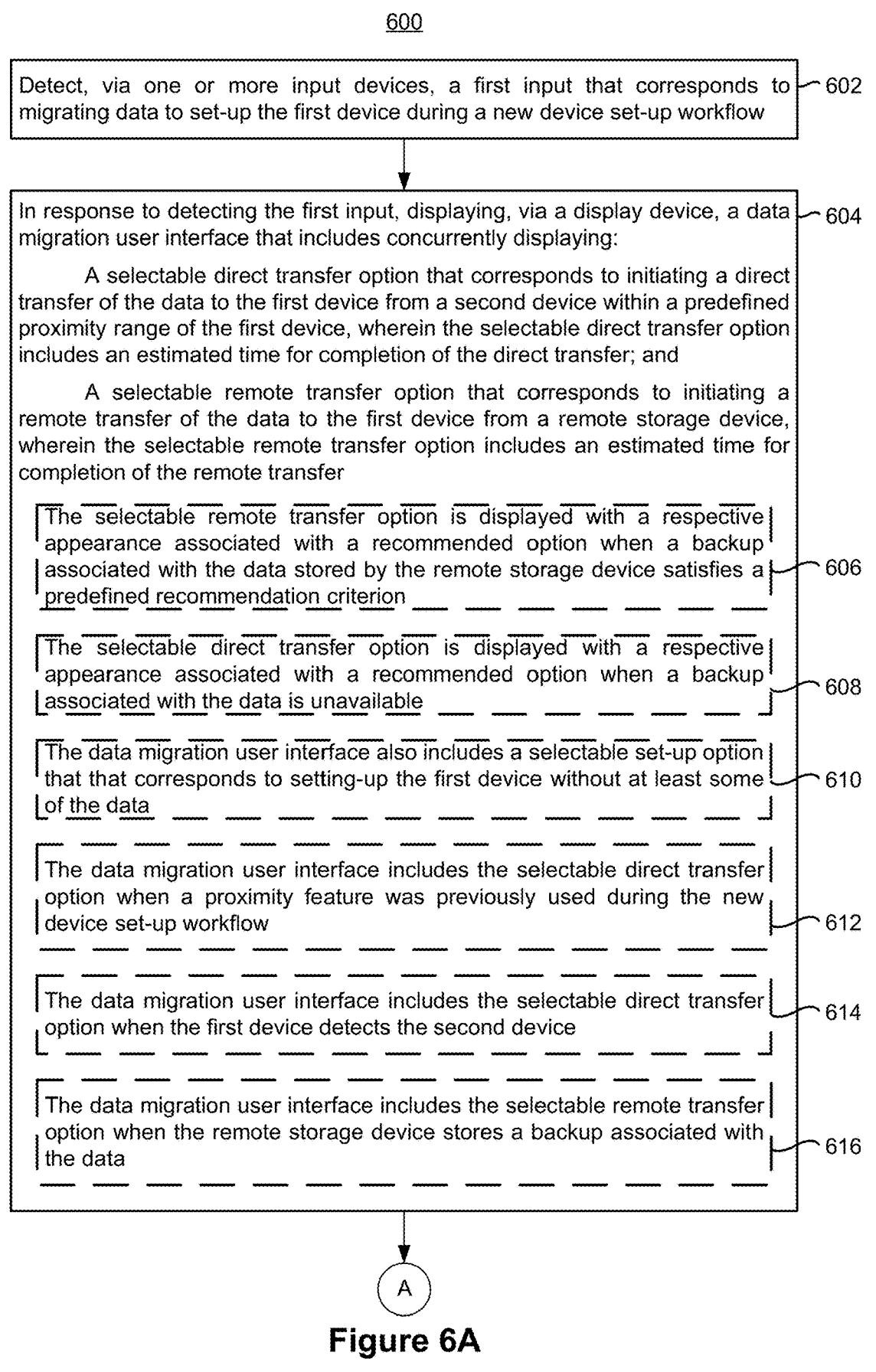

600

Detect, via one or more input devices, a first input that corresponds to migrating data to set-up the first device during a new device set-up workflow — 602

In response to detecting the first input, displaying, via a display device, a data migration user interface that includes concurrently displaying: — 604

A selectable direct transfer option that corresponds to initiating a direct transfer of the data to the first device from a second device within a predefined proximity range of the first device, wherein the selectable direct transfer option includes an estimated time for completion of the direct transfer; and A selectable remote transfer option that corresponds to initiating a remote transfer of the data to the first device from a remote storage device, wherein the selectable remote transfer option includes an estimated time for completion of the remote transfer The selectable remote transfer option is displayed with a respective appearance associated with a recommended option when a backup associated with the data stored by the remote storage device satisfies a predefined recommendation criterion — 606

The selectable direct transfer option is displayed with a respective appearance associated with a recommended option when a backup associated with the data is unavailable — 608

The data migration user interface also includes a selectable set-up option that that corresponds to setting-up the first device without at least some of the data — 610

The data migration user interface includes the selectable direct transfer option when a proximity feature was previously used during the new device set-up workflow — 612

The data migration user interface includes the selectable direct transfer option when the first device detects the second device — 614

The data migration user interface includes the selectable remote transfer option when the remote storage device stores a backup associated with the data — 616

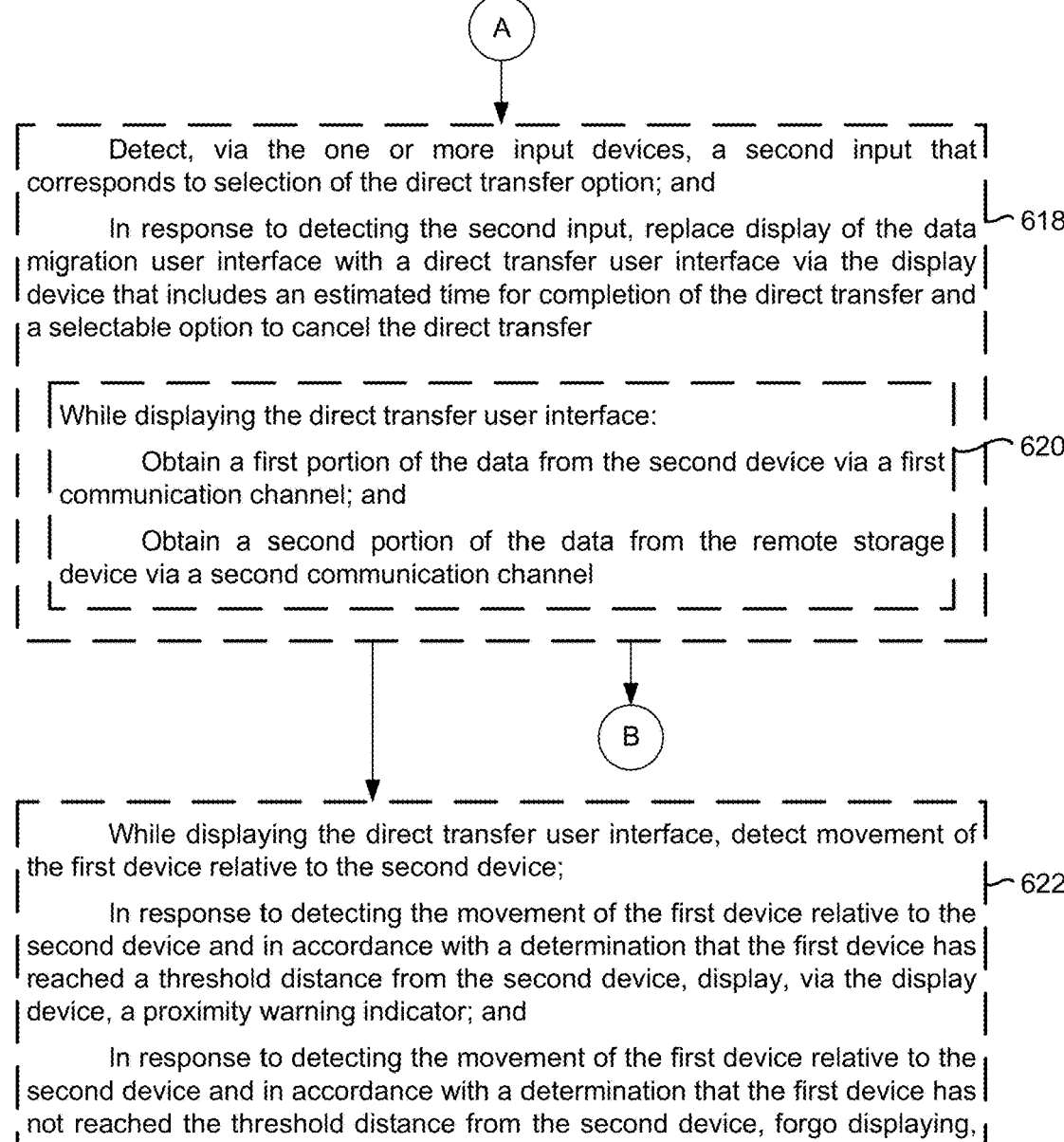

Ⓐ

Detect, via the one or more input devices, a second input that corresponds to selection of the direct transfer option; and In response to detecting the second input, replace display of the data migration user interface with a direct transfer user interface via the display device that includes an estimated time for completion of the direct transfer and a selectable option to cancel the direct transfer

— 618

While displaying the direct transfer user interface:

Obtain a first portion of the data from the second device via a first communication channel; and Obtain a second portion of the data from the remote storage device via a second communication channel

— 620

Ⓑ

While displaying the direct transfer user interface, detect movement of the first device relative to the second device;

In response to detecting the movement of the first device relative to the second device and in accordance with a determination that the first device has reached a threshold distance from the second device, display, via the display device, a proximity warning indicator; and In response to detecting the movement of the first device relative to the second device and in accordance with a determination that the first device has not reached the threshold distance from the second device, forgo displaying, via the display device, of the proximity warning indicator

— 622

Ⓑ

While displaying the direct transfer user interface, determine that the direct transfer is complete; and In response to determining that the direct transfer is complete, cause the second device to display an option to securely erase the second device

DEVICE, METHOD, AND GRAPHICAL USER INTERFACE FOR MIGRATING DATA TO A FIRST DEVICE DURING A NEW DEVICE SET-UP WORKFLOW

CROSS-REFERENCE TO RELATED APPLICATIONS

This application claims priority to U.S. Provisional Patent App. No. 62/854,708, filed on May 30, 2019, which is hereby incorporated by reference in its entirety.

TECHNICAL FIELD

This relates generally to electronic devices with touch-sensitive surfaces, including but not limited to electronic devices with touch-sensitive surfaces that migrating data to a first device during a new device set-up workflow.

BACKGROUND

Using inputs for manipulating user interfaces of an electronic device has become ubiquitous. For example, the electronic device uses peripheral-type inputs (e.g., a touch-screen input, mouse, keyboard) in order to affect the display of one or more user interfaces.

However, many of these inputs provide limited and inefficient control for manipulating the user interface. Accordingly, repetitive, complex, and/or cumbersome inputs or input types may be needed to manipulate the user interface in order for the electronic device to perform a particular operation.

SUMMARY

Accordingly, there is a need for electronic devices with faster, more efficient methods and interfaces for migrating data (via direct or remote options) to a first device during a new device set-up workflow. Such methods and interfaces optionally complement or replace conventional methods for migrating data to a first device during a new device set-up workflow. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch-screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a first device with a display device, one or more input devices, non-transitory memory, and one or more processors coupled with the non-transitory memory. The method includes: detecting, via the one or more input devices, a first input that corresponds to migrating data to set-up the first device during a new device set-up workflow; and, in response to detecting the first input, displaying, via the display device, a data migration user interface that includes concurrently displaying: a selectable direct transfer option that corresponds to initiating a direct transfer of the data to the first device from a second device within a predefined proximity range of the first device, wherein the selectable direct transfer option includes an estimated time for completion of the direct transfer; and a selectable remote transfer option that corresponds to initiating a remote transfer of the data to the first device from a remote storage device, wherein the selectable remote transfer option includes an estimated time for completion of the remote transfer.

In accordance with some embodiments, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and one or more input devices, cause the device to perform or cause performance of the operations of any of the methods described herein. In accordance with some embodiments, a graphical user interface on an electronic device with a display, one or more input devices, a non-transitory memory, and one or more processors configured to execute one or more programs stored in the non-transitory memory, including one or more of the elements displayed in any of the methods described above, which are updated in response to inputs, as described in any of the methods described herein. In accordance with some embodiments, an electronic device includes: a display, one or more input devices; and means for performing or causing performance of the operations of any of the methods described herein. In accordance with some embodiments, an information processing apparatus, for use in an electronic device with a display and one or more input devices, includes means for performing or causing performance of the operations of any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

For a better understanding of the various described embodiments, reference should be made to the Description of Embodiments below, in conjunction with the following drawings in which like reference numerals refer to corresponding parts throughout the figures.

FIG. 1B is a block diagram illustrating example components for event handling in accordance with some embodiments.

FIG. 3 is a block diagram of an example multifunction device with a display and a touch-sensitive surface in accordance with some embodiments.

FIG. 4B illustrates an example user interface for a multifunction device with a touch-sensitive surface that is separate from the display in accordance with some embodiments.

FIGS. 5A-5N illustrate example user interfaces for migrating data to a first device during a new device set-up workflow in accordance with some embodiments.

FIGS. 6A and 6B illustrate a flow diagram of a method of presenting a data migration user interface with selectable direct transfer (e.g., device-to-device (D2D)) and remote transfer (e.g., cloud server) in accordance with some embodiments.

DESCRIPTION OF EMBODIMENTS

Figure 1A:
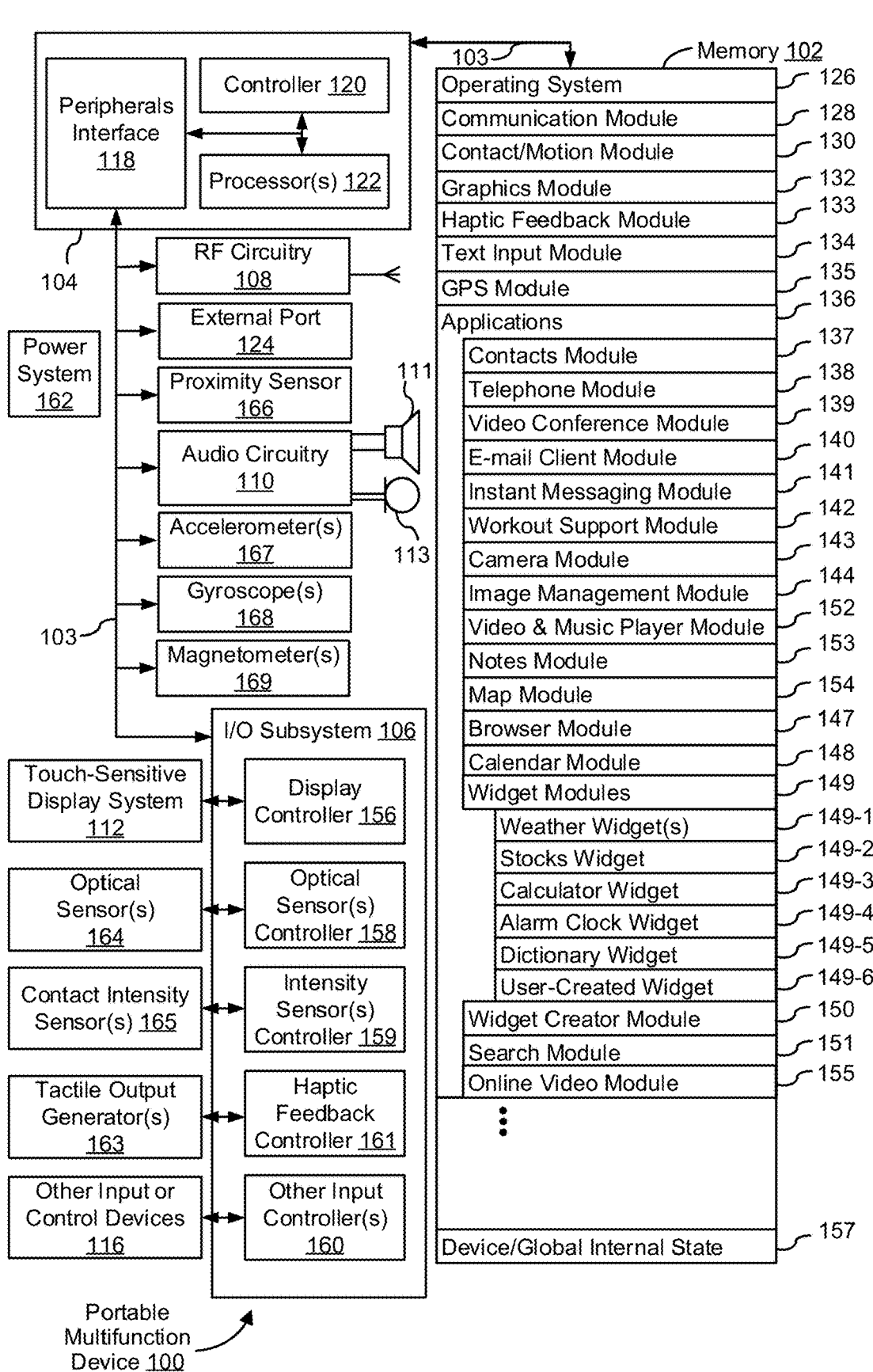
FIG. 1A is a block diagram illustrating a portable multifunction device with a touch-sensitive display in accordance with some embodiments.

Setting up a new device often involves a lengthy set-up workflow and also a lengthy time period in which data and settings are migrated to the new device when porting from an old device. Often users have their old device in proximity of the new device but instead download their data and settings from the cloud. According to some implementations, it would be faster to simply initiate a direct (D2D) transfer of data and settings from the old device via a PAN, local wireless communication channel, or the like. As such, according to some embodiments, as disclosed herein, the device presents a data migration user interface during the new device setup workflow that provides the user with options to port (pre-existing) data to the new device via (A) a direct transfer from the old device or (B) a remote transfer from a cloud server or other file server.

As described below, the method described herein provides an intuitive data migration user interface that enables a user to select between direct (D2D) and remote (cloud server) transfer options. The method reduces the cognitive burden on a user when setting-up a new device and also the direct transfer option reduces the amount of time consumed by the new device set-up workflow, thereby creating a more efficient human-machine interface. For battery-operated electronic devices, a faster new device set-up workflow reduces power consumption and increases the time between battery charges.

Below, FIGS. 1A, 1B, 2, 3, 4A, and 4B provide a description of example devices. FIGS. 5A-5N in accordance with some embodiments illustrate example user interfaces for migrating data to a first device during a new device set-up workflow in accordance with some embodiments. FIGS. 6A and 6B in accordance with some embodiments illustrate a flow diagram of a method of presenting a data migration user interface with selectable direct transfer (e.g., D2D) and remote transfer (e.g., cloud server) in accordance with some embodiments. The user interfaces in FIGS. 5A-5N are used to illustrate the process in FIGS. 6A and 6B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touchscreen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating a portable multifunction device 100 with a touch-sensitive display system 112 in accordance with some embodiments. The touch-sensitive display system 112 is sometimes called a "touch-screen," for convenience, and is sometimes simply called a touch-sensitive display. The device 100 includes a memory 102 (which optionally includes one or more computer readable storage mediums), a memory controller 122, one or more processing units (CPUs) 120, a peripherals interface 118, an RF circuitry 108, audio circuitry 110, a speaker 111, a microphone 113, an input/output (I/O) subsystem 106, other input or control devices 116, and an external port 124. The device 100 optionally includes one or more optical sensors 164. The device 100 optionally includes one or more intensity sensors 165 for detecting intensity of contacts on the device 100 (e.g., a touch-sensitive surface such as the touch-sensitive display system 112 of the device 100). The device 100 optionally includes one or more tactile output generators 163 for generating tactile outputs on the device 100 (e.g., generating tactile outputs on a touch-sensitive surface such as the touch-sensitive display system 112 of the device 100 or a touchpad 355 of a device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

The memory 102 optionally includes high-speed random-access memory and optionally also includes non-volatile memory, such as one or more magnetic disk storage devices, flash memory devices, or other non-volatile solid-state memory devices. Access to the memory 102 by other components of the device 100, such as the one or more CPUs 120 and the peripherals interface 118, is, optionally, controlled by the memory controller 122.

The peripherals interface 118 can be used to couple input and output peripherals of the device to the one or more CPUs 120 and the memory 102. The one or more CPUs 120 run or execute various software programs and/or sets of instructions stored in the memory 102 to perform various functions for the device 100 and to process data.

In some embodiments, the peripherals interface 118, the one or more CPUs 120, and the memory controller 122 are, optionally, implemented on a single chip, such as a chip 104. In some other embodiments, they are, optionally, implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data is, optionally, retrieved from and/or transmitted to the memory 102 and/or the RF circuitry 108 by the peripherals interface 118. In some embodiments, the audio circuitry 110 also includes a headset jack (e.g., a headset jack 212 in FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch-sensitive display system 112 and the other input or control devices 116, with the peripherals interface 118. The I/O subsystem 106 optionally includes a display controller 156, an optical sensor controller 158, an intensity sensor controller 159, a haptic feedback controller 161, and one or more input controllers 160 for other input or control devices. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate embodiments, the one or more input controllers 160 are, optionally, coupled with any (or none) of the following: a keyboard, infrared port, USB port, stylus, and/or a pointer device such as a mouse. The one or more buttons (e.g., buttons 208 in FIG. 2) optionally include an up/down button for volume control of the speaker 111 and/or the microphone 113. The one or more buttons optionally include a push button (e.g., a push button 206 in FIG. 2).

The touch-sensitive display system 112 provides an input interface and an output interface between the device and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some embodiments, some or all of the visual output corresponds to user-interface objects.

The touch-sensitive display system 112 has a touch-sensitive surface, sensor or set of sensors that accepts input from the user based on haptic/tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example embodiment, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other embodiments. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112. In an example embodiment, projected mutual capacitance sensing technology is used, such as that found in the iPhone®, iPod Touch®, and iPad® from Apple Inc. of Cupertino, California.

The touch-sensitive display system 112 optionally has a video resolution in excess of 100 dpi. In some embodiments, the touch-screen video resolution is in excess of 400 dpi (e.g., 500 dpi, 800 dpi, or greater). The user optionally contacts touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touchscreen. In some embodiments, the device translates the rough finger-based input into a precise pointer/cursor position or command for performing the actions desired by the user.

In some embodiments, in addition to the touchscreen, the device 100 optionally includes a touchpad for activating or deactivating particular functions. In some embodiments, the touchpad is a touch-sensitive area of the device that, unlike the touchscreen, does not display visual output. The touchpad is, optionally, a touch-sensitive surface that is separate from the touch-sensitive display system 112 or an extension of the touch-sensitive surface formed by the touchscreen.

The device 100 also includes a power system 162 for powering the various components. The power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 optionally also includes one or more optical sensors 164. FIG. 1A shows an optical sensor coupled with the optical sensor controller 158 in the I/O subsystem 106. The one or more optical sensors 164 optionally include charge-coupled device (CCD) or complementary metal-oxide semiconductor (CMOS) phototransistors. The one or more optical sensors 164 receive light from the environment, projected through one or more lens, and converts the light to data representing an image. In conjunction with an imaging module 143 (also called a camera module), The one or more optical sensors 164 optionally capture still images and/or video. In some embodiments, an optical sensor is located on the back of the device 100, opposite the touch-sensitive display system 112 on the front of the device 100, so that the touch-screen is enabled for use as a viewfinder for still and/or video image acquisition. In some embodiments, another optical sensor is located on the front of the device 100 so that the user's image is obtained (e.g., for selfies, for videoconferencing while the user views the other video conference participants on the touchscreen, etc.).

The device 100 optionally also includes one or more contact intensity sensors 165. FIG. 1A shows a contact intensity sensor coupled with the intensity sensor controller 159 in the I/O subsystem 106. The one or more contact intensity sensors 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The one or more contact intensity sensors 165 receive contact intensity information (e.g., pressure information or a proxy for pressure information) from the environment. In some embodiments, at least one contact intensity sensor is collocated with, or proximate to, a touch-sensitive surface (e.g., the touch-sensitive display system 112). In some embodiments, at least one contact intensity sensor is located on the back of the device 100, opposite the touch-screen display system 112, which is located on the front of the device 100.

The device 100 optionally also includes one or more proximity sensors 166. FIG. 1A shows proximity sensor 166 coupled with peripherals interface 118. Alternately, a proximity sensor 166 is coupled with the input controller 160 in the I/O subsystem 106. In some embodiments, the proximity sensor 166 turns off and disables the touch-sensitive display system 112 when the device 100 is placed near the user's ear (e.g., when the user is making a phone call).

The device 100 optionally also includes one or more tactile output generators 163. FIG. 1A shows a tactile output generator coupled with haptic feedback controller 161 in I/O subsystem 106. The one or more tactile output generators 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). one or more tactile output generators 163 receive tactile feedback generation instructions from the haptic feedback module 133 and generates tactile outputs on the device 100 that are capable of being sensed by a user of the device 100. In some embodiments, at least one tactile output generator is collocated with, or proximate to, a touch-sensitive surface (e.g., the touch-sensitive display system 112) and, optionally, generates a tactile output by moving the touch-sensitive surface vertically (e.g., in/out of a surface of the device 100) or laterally (e.g., back and forth in the same plane as a surface of the device 100). In some embodiments, at least one tactile output generator sensor is located on the back of the device 100, opposite the touch-sensitive display system 112, which is located on the front of the device 100.

The device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows the sensors 167, 168, and 169 coupled with the peripherals interface 118. Alternately, the sensors 167, 168, and 169 are, optionally, coupled with an input controller 160 in the I/O subsystem 106. In some embodiments, information is displayed on the touch-screen display in a portrait view or a landscape view based on an analysis of data received from the one or more accelerometers. The device 100 optionally includes a GPS (or GLONASS or other global navigation system) receiver for obtaining information concerning the location of the device 100.

In some embodiments, the software components stored in the memory 102 include an operating system 126, a communication module (or set of instructions) 128, a contact/motion module (or set of instructions) 130, a graphics module (or set of instructions) 132, a haptic feedback module (or set of instructions) 133, a text input module (or set of instructions) 134, a Global Positioning System (GPS) module (or set of instructions) 135, and applications (or sets of instructions) 136. Furthermore, in some embodiments, the memory 102 stores a device/global internal state 157, as shown in FIGS. 1A and 3. The device/global internal state 157 includes one or more of: active application state, indicating which applications, if any, are currently active; display state, indicating what applications, views or other information occupy various regions of the touch-sensitive display system 112; sensor state, including information obtained from the device's various sensors and the other input or control devices 116; and location and/or positional information concerning the device's location and/or attitude.

The operating system 126 (e.g., iOS, DARWIN, RTXC, LINUX, UNIX, OS X, WINDOWS, or an embedded operating system such as VXWORKS) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or external port 124. The one or more external ports 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

The contact/motion module 130 optionally detects contact with the touch-sensitive display system 112 (in conjunction with the display controller 156) and other touch-sensitive devices (e.g., a touchpad or physical click wheel). The contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, the contact/motion module 130 and the display controller 156 detect contact on a touchpad.

The contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

The graphics module 132 includes various known software components for rendering and displaying graphics on the touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations, and the like.

In some embodiments, the graphics module 132 stores data representing graphics to be used. Each graphic is, optionally, assigned a corresponding code. The graphics module 132 receives, from applications etc., one or more codes specifying graphics to be displayed along with, if necessary, coordinate data and other graphic property data, and then generates screen image data to output to the display controller 156.

The haptic feedback module 133 includes various software components for generating instructions used by the one or more tactile output generators 163 to produce tactile outputs at one or more locations on the device 100 in response to user interactions with the device 100.

The text input module 134, which is, optionally, a component of the graphics module 132, provides soft keyboards for entering text in various applications (e.g., a contacts module 137, an e-mail client module 140, an IM module 141, a browser 147, and any other application that needs text input).

The GPS module 135 determines the location of the device and provides this information for use in various applications (e.g., to a telephone module 138 for use in location-based dialing, to a camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a browser module 147;
- a calendar module 148;
- widget modules 149, which optionally include one or more of: a weather widget 149-1, a stocks widget 149-2, a calculator widget 149-3, an alarm clock widget 149-4, a dictionary widget 149-5, and other widgets obtained by the user, as well as a user-created widgets 149-6;
- a widget creator module 150 for making the user-created widgets 149-6;
- a search module 151;
- a video and music player module 152, which is, optionally, made up of a video player module and a music player module;
- a notes module 153;
- a map module 154; and/or
- an online video module 155.

Examples of other applications 136 that are, optionally, stored in the memory 102 include other word processing applications, other image editing applications, drawing applications, presentation applications, JAVA-enabled applications, encryption, digital rights management, voice recognition, and voice replication.

In conjunction with the touch-sensitive display system 112, the display controller 156, the contact module 130, the graphics module 132, and the text input module 134, the contacts module 137 includes executable instructions to manage an address book or contact list (e.g., stored in the application internal state 192 of the contacts module 137 in the memory 102 or a memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by the telephone module 138, the video conferencing module 139, the e-mail client module 140, or the IM module 141; and so forth.

In conjunction with the RF circuitry 108, the audio circuitry 110, the speaker 111, the microphone 113, the touch-sensitive display system 112, the display controller 156, the contact module 130, the graphics module 132, and the text input module 134, the telephone module 138 includes executable instructions to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication optionally uses any of a plurality of communications standards, protocols, and technologies.

In conjunction with the RF circuitry 108, the audio circuitry 110, the speaker 111, the microphone 113, the touch-sensitive display system 112, the display controller 156, the one or more optical sensors 164, the optical sensor controller 158, the contact module 130, the graphics module 132, the text input module 134, the contact list 137, and the telephone module 138, the video conferencing module 139 includes executable instructions to initiate, conduct, and terminate a video conference between a user and one or more other participants in accordance with user instructions.

In conjunction with the RF circuitry 108, the touch-sensitive display system 112, the display controller 156, the contact module 130, the graphics module 132, and the text input module 134, the e-mail client module 140 includes executable instructions to create, send, receive, and manage e-mail in response to user instructions. In conjunction with the image management module 144, the e-mail client module 140 makes it quite easy to create and send e-mails with still or video images taken with the camera module 143.

In conjunction with the RF circuitry 108, the touch-sensitive display system 112, the display controller 156, the contact module 130, the graphics module 132, and the text input module 134, the IM module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with the RF circuitry 108, the touch-sensitive display system 112, the display controller 156, the contact module 130, the graphics module 132, the text input module 134, the GPS module 135, and the map module 154, the workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with the touch-sensitive display system 112, the display controller 156, the one or more optical sensors 164, the optical sensor controller 158, the contact module 130, the graphics module 132, and the image management module 144, the camera module 143 includes executable instructions to capture still images or video (including a video stream) and store them into the memory

102, modify characteristics of a still image or video, and/or delete a still image or video from the memory 102.

In conjunction with the touch-sensitive display system 112, the display controller 156, the contact module 130, the graphics module 132, the text input module 134, and the camera module 143, the image management module 144 includes executable instructions to arrange, modify (e.g., edit), or otherwise manipulate, label, delete, present (e.g., in a digital slide show or album), and store still and/or video images.

In conjunction with the RF circuitry 108, the touch-sensitive display system 112, the display controller 156, the contact module 130, the graphics module 132, and the text input module 134, the browser module 147 includes executable instructions to browse the Internet in accordance with user instructions, including searching, linking to, receiving, and displaying web pages or portions thereof, as well as attachments and other files linked to web pages.

In conjunction with the RF circuitry 108, the touch-sensitive display system 112, the display controller 156, the contact module 130, the graphics module 132, the text input module 134, the e-mail client module 140, and the browser module 147, the calendar module 148 includes executable instructions to create, display, modify, and store calendars and data associated with calendars (e.g., calendar entries, to do lists, etc.) in accordance with user instructions.

In conjunction with the RF circuitry 108, the touch-sensitive display system 112, the display controller 156, the contact module 130, the graphics module 132, the text input module 134, and the browser module 147, the widget modules 149 are mini-applications that are, optionally, downloaded and used by a user (e.g., the weather widget 149-1, the stocks widget 149-2, the calculator widget 149-3, the alarm clock widget 149-4, and the dictionary widget 149-5) or created by the user (e.g., the user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., YAHOO! Widgets).

In conjunction with the RF circuitry 108 the, touch-sensitive display system 112, the display controller 156, the contact module 130, the graphics module 132, the text input module 134, and the browser module 147, the widget creator module 150 includes executable instructions to create widgets (e.g., turning a user-specified portion of a web page into a widget).

In conjunction with the touch-sensitive display system 112, the display controller 156, the contact module 130, the graphics module 132, and the text input module 134, the search module 151 includes executable instructions to search for text, music, sound, image, video, and/or other files in the memory 102 that match one or more search criteria (e.g., one or more user-specified search terms) in accordance with user instructions.

In conjunction with the touch-sensitive display system 112, the display controller 156, the contact module 130, the graphics module 132, the audio circuitry 110, the speaker 111, the RF circuitry 108, and the browser module 147, the video and music player module 152 includes executable instructions that allow the user to download and play back recorded music and other sound files stored in one or more file formats, such as MP3 or AAC files, and executable instructions to display, present or otherwise play back videos (e.g., on the touch-sensitive display system 112, or on an external display connected wirelessly or via the one or more external ports 124). In some embodiments, the device 100 optionally includes the functionality of an MP3 player, such as an iPod (trademark of Apple Inc. of Cupertino, California).

In conjunction with touch-sensitive the display system 112, the display controller 156, the contact module 130, the graphics module 132, and the text input module 134, the notes module 153 includes executable instructions to create and manage notes, to do lists, and the like in accordance with user instructions.

In conjunction with the RF circuitry 108, the touch-sensitive display system 112, the display controller 156, the contact module 130, the graphics module 132, the text input module 134, the GPS module 135, and the browser module 147, the map module 154 includes executable instructions to receive, display, modify, and store maps and data associated with maps (e.g., driving directions; data on stores and other points of interest at or near a particular location; and other location-based data) in accordance with user instructions.

In conjunction with the touch-sensitive display system 112, the display controller 156, the contact module 130, the graphics module 132, the audio circuitry 110, the speaker 111, the RF circuitry 108, the text input module 134, the e-mail client module 140, and the browser module 147, the online video module 155 includes executable instructions that allow the user to access, browse, receive (e.g., by streaming and/or download), play back (e.g., on the touch-screen 112, or on an external display connected wirelessly or via the one or more external ports 124), send an e-mail with a link to a particular online video, and otherwise manage online videos in one or more file formats, such as H.264. In some embodiments, the instant messaging module 141, rather than the e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, the memory 102 optionally stores a subset of the modules and data structures identified above. Furthermore, the memory 102 optionally stores additional modules and data structures not described above.

In some embodiments, the device 100 is a device where operation of a predefined set of functions on the device is performed exclusively through a touchscreen and/or a touchpad. By using a touch-screen and/or a touchpad as the primary input control device for operation of the device 100, the number of physical input control devices (such as push buttons, dials, and the like) on the device 100 is, optionally, reduced.

The predefined set of functions that are performed exclusively through a touchscreen and/or a touchpad optionally include navigation between user interfaces. In some embodiments, the touchpad, when touched by the user, navigates the device 100 to a main, home, or root menu from any user interface that is displayed on the device 100. In such embodiments, a "menu button" is implemented using a touchpad. In some other embodiments, the menu button is a physical push button or other physical input control device instead of a touchpad.

FIG. 1B is a block diagram illustrating example components for event handling in accordance with some embodiments. In some embodiments, the memory 102 (in FIG. 1A) or 370 (FIG. 3) includes an event sorter 170 (e.g., in the operating system 126) and a respective application 136-1 (e.g., any of the aforementioned applications 136, 137-155, 380-390).

The event sorter 170 receives event information and determines the application 136-1 and the application view 191 of the application 136-1 to which to deliver the event information. The event sorter 170 includes an event monitor 171 and an event dispatcher module 174. In some embodiments, the application 136-1 includes an application internal state 192, which indicates the current application view(s) displayed on the touch-sensitive display system 112 when the application is active or executing. In some embodiments, the device/global internal state 157 is used by the event sorter 170 to determine which application(s) is (are) currently active, and the application internal state 192 is used by the event sorter 170 to determine the application views 191 to which to deliver event information.

In some embodiments, the application internal state 192 includes additional information, such as one or more of: resume information to be used when the application 136-1 resumes execution, user interface state information that indicates information being displayed or that is ready for display by the application 136-1, a state queue for enabling the user to go back to a prior state or view of the application 136-1, and a redo/undo queue of previous actions taken by the user.

The event monitor 171 receives event information from the peripherals interface 118. Event information includes information about a sub-event (e.g., a user touch on touch-sensitive display system 112, as part of a multi-touch gesture). The peripherals interface 118 transmits information it receives from the I/O subsystem 106 or a sensor, such as the proximity sensor 166, the accelerometer(s) 167, the gyroscope(s) 168, the magnetometer(s) 169, and/or the microphone 113 (through audio circuitry the 110). Information that the peripherals interface 118 receives from the I/O subsystem 106 includes information from the touch-sensitive display system 112 or a touch-sensitive surface.

In some embodiments, the event monitor 171 sends requests to the peripherals interface 118 at predetermined intervals. In response, the peripherals interface 118 transmits event information. In other embodiments, the peripherals interface 118 transmits event information only when there is a significant event (e.g., receiving an input above a predetermined noise threshold and/or for more than a predetermined duration).

In some embodiments, the event sorter 170 also includes a hit view determination module 172 and/or an active event recognizer determination module 173.

The hit view determination module 172 provides software procedures for determining where a sub-event has taken place within one or more views, when the touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

The hit view determination module 172 receives information related to sub-events of a touch-based gesture. When an application has multiple views organized in a hierarchy, the hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

The active event recognizer determination module 173 determines which view or views within a view hierarchy should receive a particular sequence of sub-events. In some embodiments, the active event recognizer determination module 173 determines that only the hit view should receive a particular sequence of sub-events. In other embodiments, the active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

The event dispatcher module 174 dispatches the event information to an event recognizer (e.g., an event recognizer 180). In some embodiments including the active event recognizer determination module 173, the event dispatcher module 174 delivers the event information to an event recognizer determined by the active event recognizer determination module 173. In some embodiments, event dispatcher module 174 stores in an event queue the event information, which is retrieved by a respective event receiver module 182.

In some embodiments, the operating system 126 includes the event sorter 170. Alternatively, the application 136-1 includes the event sorter 170. In yet other embodiments, the event sorter 170 is a stand-alone module, or a part of another module stored in the memory 102, such as the contact/motion module 130.

In some embodiments, the application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which the application 136-1 inherits methods and other properties. In some embodiments, a respective event handler 190 includes one or more of: a data updater 176, an object updater 177, a GUI updater 178, and/or event data 179 received from the event sorter 170. The event handler 190 optionally utilizes or calls the data updater 176, the object updater 177, or the GUI updater 178 to update the application internal state 192. Alternatively, one or more of the application views 191 includes one or more respective event handlers 190. Also, in some embodiments, one or more of the data updater 176, the object updater 177, and the GUI updater 178 are included in a respective application view 191.

A respective event recognizer 180 receives event information (e.g., the event data 179) from the event sorter 170 and identifies an event from the event information. The event recognizer 180 includes an event receiver 182 and an event comparator 184. In some embodiments, the event recognizer 180 also includes at least a subset of: metadata 183, and event delivery instructions 188 (which optionally include sub-event delivery instructions).

The event receiver 182 receives event information from the event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

The event comparator 184 compares the event information to predefined event or sub-event definitions and, based on the comparison, determines an event or sub-event, or determines or updates the state of an event or sub-event. In some embodiments, the event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across the touch-sensitive display system 112, and lift-off of the touch (touch end). In some embodiments, the event also includes information for one or more associated event handlers 190.

In some embodiments, the event definition 187 includes a definition of an event for a respective user-interface object. In some embodiments, the event comparator 184 performs a hit test to determine which user-interface object is associated with a sub-event. For example, in an application view in which three user-interface objects are displayed on the touch-sensitive display system 112, when a touch is detected on the touch-sensitive display system 112, the event comparator 184 performs a hit test to determine which of the three user-interface objects is associated with the touch (sub-event). If each displayed object is associated with a respective event handler 190, the event comparator uses the result of the hit test to determine which the event handler 190 should be activated. For example, the event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, the metadata 183 includes configurable properties, flags, and/or lists that indicate how event recognizers interact, or are enabled to interact, with one another. In some embodiments, the metadata 183 includes configurable properties, flags, and/or lists that indicate whether sub-events are delivered to varying levels in the view or programmatic hierarchy.

In some embodiments, a respective event recognizer 180 activates the event handler 190 associated with an event when one or more particular sub-events of an event are recognized. In some embodiments, a respective event recognizer 180 delivers event information associated with the event to the event handler 190. Activating an event handler 190 is distinct from sending (and deferred sending) sub-events to a respective hit view. In some embodiments, the event recognizer 180 throws a flag associated with the recognized event, and the event handler 190 associated with the flag catches the flag and performs a predefined process.

In some embodiments, the event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, the data updater 176 creates and updates data used in the application 136-1. For example, the data updater 176 updates the telephone number used in the contacts module 137 or stores a video file used by the video and music player module 152. In some embodiments, the object updater 177 creates and updates objects used in the application 136-1. For example, the object updater 177 creates a new user-interface object or updates the position of a user-interface object. The GUI updater 178 updates the GUI. For example, the GUI updater 178 prepares display information and sends it to the graphics module 132 for display on the touch-sensitive display 112.

In some embodiments, the event handler(s) 190 includes or has access to the data updater 176, the object updater 177, and the GUI updater 178. In some embodiments, the data updater 176, the object updater 177, and the GUI updater 178 are included in a single module of a respective application 136-1 or the application view 191. In other embodiments, they are included in two or more software modules.

It shall be understood that the foregoing discussion regarding event handling of user touches on touch-sensitive displays also applies to other forms of user inputs to operate the multifunction devices 100 with input-devices, not all of which are initiated on touchscreens. For example, mouse movement and mouse button presses, optionally coordinated with single or multiple keyboard presses or holds; contact movements such as taps, drags, scrolls, etc., on touch-pads;

pen stylus inputs; movement of the device; oral instructions; detected eye movements; biometric inputs; and/or any combination thereof are optionally utilized as inputs corresponding to sub-events which define an event to be recognized.

Figure 2:
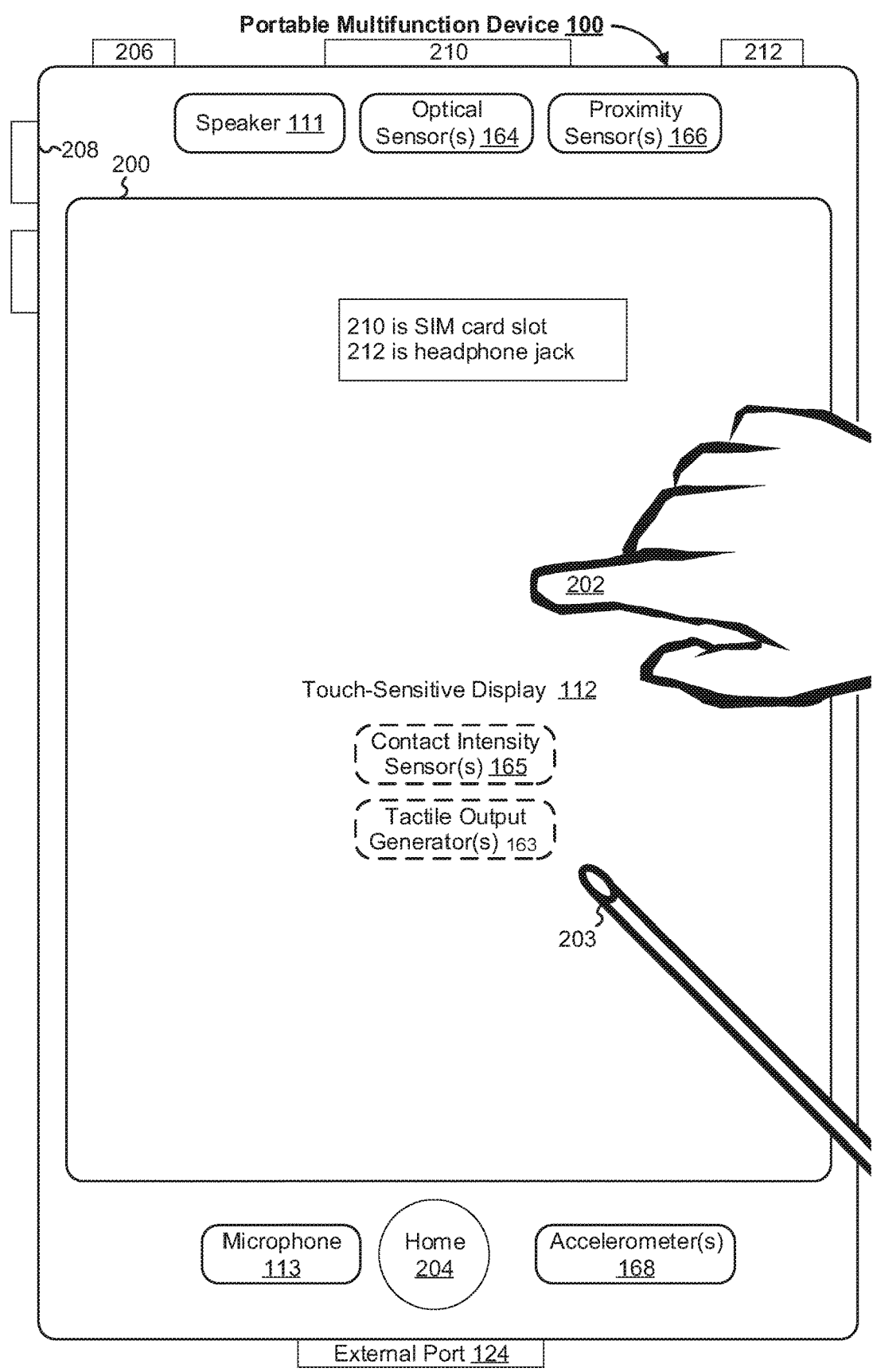
FIG. 2 illustrates a portable multifunction device having a touchscreen in accordance with some embodiments.

FIG. 2 illustrates a portable multifunction device 100 having a touchscreen (e.g., touch-sensitive display system 112, FIG. 1A) in accordance with some embodiments. The touchscreen optionally displays one or more graphics within a user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

The device 100 optionally also includes one or more physical buttons, such as "home" or menu button 204. As described previously, menu button 204 is, optionally, used to navigate to any application 136 in a set of applications that are, optionally, executed on the device 100. Alternatively, in some embodiments, the menu button is implemented as a soft key in a GUI displayed on the touch-screen display.

In some embodiments, the device 100 includes the touch-screen display 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, the device 100 also accepts verbal input for activation or deactivation of some functions through the microphone 113. The device 100 also, optionally, includes the one or more contact intensity sensors 165 for detecting intensity of contacts on the touch-sensitive display system 112 and/or the one or more tactile output generators 163 for generating tactile outputs for a user of the device 100.

FIG. 3 is a block diagram of an example multifunction device with a display and a touch-sensitive surface in accordance with some embodiments. The device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPUs) 310, one or more network or other communications interfaces 360, a memory 370, and one or more communication buses 320 for interconnecting these components. The communication buses 320 optionally include circuitry (sometimes called a chipset) that interconnects and controls communications between system components. The device 300 includes an input/output (I/O) interface 330 comprising a display 340, which is typically a touch-screen display. The I/O interface 330 also optionally includes a keyboard and/or mouse (or other pointing device) 350 and touchpad 355, a tactile output generator 357 for generating tactile outputs on the device 300 (e.g., similar to the one or more tactile output generators 163 described above with reference to FIG. 1A), sensors 359 (e.g., touch-sensitive, optical, contact intensity, proximity, acceleration, attitude, and/or magnetic sensors similar to the sensors 112, 164, 165, 166, 167, 168, and 169 described above with reference to FIG. 1A).

The memory 370 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. The memory 370 optionally includes one or more storage devices remotely located from the one or more processing units 310. In some embodiments, the memory 370 stores programs, modules, and data structures analogous to the programs, modules, and data structures stored in the memory 102 of the portable multifunction device 100 (FIG. 1A), or a subset thereof. Furthermore, the memory 370 optionally stores additional programs, modules, and data structures do not present in the memory 102 of the portable multifunction device 100. For example, the memory 370 of device 300 optionally stores a drawing module 380, a presentation module 382, a word processing module 384, a website creation module 386, a disk authoring module 388, and/or a spreadsheet module 390, while the memory 102 of the portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, the memory 370 optionally stores a subset of the modules and data structures identified above. Furthermore, the memory 370 optionally stores additional modules and data structures not described above.

Attention is now directed towards embodiments of user interfaces ("UI") that are, optionally, implemented on the portable multifunction device 100.

Figure 4A:
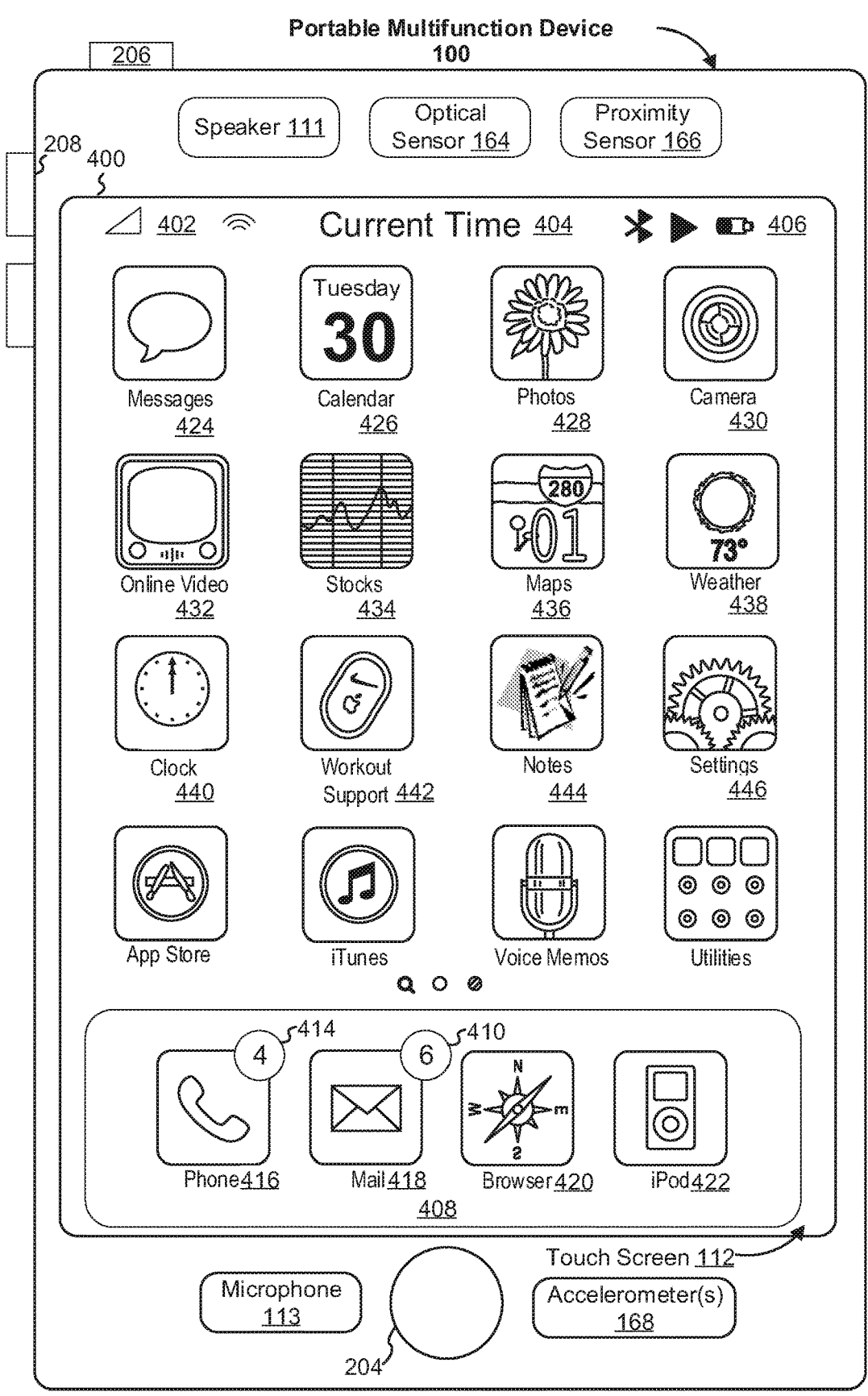
FIG. 4A illustrates an example user interface for a menu of applications on a portable multifunction device in accordance with some embodiments.

FIG. 4A illustrates an example user interface for a menu of applications on the portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for the telephone module 138, labeled "Phone," which optionally includes an indicator 414 of the number of missed calls or voicemail messages;

Icon 418 for the e-mail client module 140, labeled "Mail," which optionally includes an indicator 410 of the number of unread e-mails;

Icon 420 for the browser module 147, labeled "Browser"; and

Icon 422 for the video and music player module 152, also referred to as iPod (trademark of Apple Inc. of Cupertino, California) module 152, labeled "iPod"; and Icons for other applications, such as:

Icon 424 for the IM module 141, labeled "Text";

Icon 426 for the calendar module 148, labeled "Calendar";

Icon 428 for the image management module 144, labeled "Photos";

Icon 430 for the camera module 143, labeled "Camera";

Icon 434 for the stocks widget 149-2, labeled "Stocks";

Icon 436 for the map module 154, labeled "Map";

Icon 438 for the weather widget 149-1, labeled "Weather";

Icon 440 for the alarm clock widget 169-6, labeled "Clock";

Icon 442 for the workout support module 142, labeled "Workout Support";

Icon 444 for the notes module 153, labeled "Notes"; and

Icon 446 for a settings application or module, which provides access to settings for device 100 and its various applications 136.

It should be noted that the icon labels illustrated in FIG. 4A are merely examples. For example, in some embodiments, the icon 422 for the video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., the device 300, FIG. 3) with a touch-sensitive surface 451 (e.g., a tablet or touchpad 355, FIG. 3) that is separate from the display 450. The device 300 also, optionally, includes one or more contact intensity sensors (e.g., the one or more of sensors 359) for detecting intensity of contacts on the touch-sensitive surface 451 and/or the one or more tactile output generators 359 for generating tactile outputs for a user of the device 300.

FIG. 4B illustrates an example user interface on a device (e.g., the device 300, FIG. 3) with a touch-sensitive surface 451 (e.g., a tablet or touchpad 355, FIG. 3) that is separate from the display 450. Although many of the examples that follow will be given with reference to inputs on the touch-screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., the touch-sensitive surface 451 in FIG. 4B) has a primary axis (e.g., a primary axis 452 in FIG. 4B) that corresponds to a primary axis (e.g., a primary axis 453 in FIG. 4B) on the display (e.g., the display 450 in FIG. 4B). In accordance with these embodiments, the device detects contacts (e.g., contacts 460 and 462 in FIG. 4B) with the touch-sensitive surface 451 at locations that correspond to respective locations on the display (e.g., in FIG. 4B, the contact 460 corresponds to a location 468 and the contact 462 corresponds to a location 470). In this way, user inputs (e.g., contacts 460 and 462, and movements thereof) detected by the device on the touch-sensitive surface (e.g., the touch-sensitive surface 451 in FIG. 4B) are used by the device to manipulate the user interface on the display (e.g., the display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., the touchpad 355 in FIG. 3 or the touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., the touch-sensitive display system 112 in FIG. 1A or the touch-screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch-screen) will indicate that the user is intending to activate the respective button (as opposed to other user interface elements shown on a display of the device).

User Interfaces and Associated Processes

Attention is now directed toward embodiments of user interfaces ("UI") and associated processes that may be implemented on an electronic device, such as a portable multifunction device (PMD) 100 with a display, a touch-sensitive surface, and optionally one or more sensors to detect intensity of contacts with the touch-sensitive surface, or a device 300 with one or more processors, non-transitory memory, a display device, and one or more input devices.

FIGS. 5A-5N illustrate example user interfaces for migrating data to a first device during a new device set-up workflow in accordance with some embodiments. The user interfaces in these figures are used to illustrate the processes described below, including the processes in FIGS. 6A and 6B. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B. In some embodiments, user inputs are sometimes referred to herein as touch inputs or touch input gestures.

FIGS. 5A-5N show various user interfaces displayed on both a new device 502 and an old device 504 during a new device set-up workflow in accordance with some embodiments. For example, a user is upgrading or switching from the old device 504 to the new device 502. For example, the new device 502 corresponds to one of a mobile phone, a tablet, a laptop, a wearable computing device, the PMD 100, or the like. For example, the old device 504 corresponds to one of a mobile phone, a tablet, a laptop, a wearable computing device, the PMD 100, or the like.

As shown in FIGS. 5A and 5B, the old device 504 displays a wake screen user interface 516. As shown in FIG. 5A, the new device 502 displays a welcome screen user interface 512 that includes a set-up initiation affordance 514, which, when selected (e.g., with a left-to-right swipe gesture thereover), causes the new device 502 to initiate a new device set-up workflow. In some embodiments, the new device 502 displays the welcome screen user interface 512 when first powered-on, after being erased, or after initiating a device restore process.

As shown in FIG. 5A, the new device 502 detects a user input 505 (e.g., a left-to-right swipe gesture) at a location that originates over the set-up initiation affordance 514. In response to detecting the user input 505, the new device 502 displays a region selection user interface 522 in FIG. 5B. According to some embodiments, the region selection user interface 522 includes selectable region affordances 526A-526G (sometimes collectively referred to herein as the "selectable region affordances 526"), which, when selected (e.g., with a single or double tap gesture), causes the new device 502 to set a plurality settings (e.g., language, keyboard, etc.) based on a region/country associated with the respective one of the selectable region affordances 526 that has been selected. According to some embodiments, the region selection user interface 522 also includes a back affordance 524, which, when selected (e.g., with a single or double tap gesture), causes the new device 502 to redisplay the previous user interface (e.g., the welcome screen user interface 512 in FIG. 5A).

As shown in FIG. 5B, the new device 502 detects a user input 507 (e.g., a single or double tap gesture) at a location that corresponds to the selectable region affordance 526A. In response to detecting the user input 507, the new device 502 displays an authentication bootstrap user interface 530 in FIG. 5C.

FIGS. 5C-5G illustrate a sequence in which a proximity-based authentication bootstrapping process is used to authenticate a user of the new device 502 with the old device 504 in accordance with some embodiments. According to some embodiments, the authentication bootstrap user interface 530 includes instructions to bring a compatible old device within proximity of the new device 502 in order to use the compatible old device to sign-in or authenticate the user automatically. According to some embodiments, the authentication bootstrap user interface 530 also includes a manual set-up affordance 532, which, when selected (e.g., with a left-to-right swipe gesture thereover), causes the new device 502 to skip the proximity-based authentication boot-strapping process.

In response to detecting the new device 502 (e.g., receiving a beacon, BLUETOOTH, etc. signal from the new device 502), the old device 504 displays a bootstrapping prompt user interface 534 overlaid on the wake screen user interface 516 in FIG. 5C. According to some embodiments, the bootstrapping prompt user interface 534 includes a continue affordance 536, which, when selected (e.g., with a single or double tap gesture), causes the old device 504 to establish a connection with the new device 502 (e.g., as shown in FIGS. 5C and 5D).

As shown in FIG. 5C, the old device 504 detects a user input 509 (e.g., a single or double tap gesture) at a location that corresponds to the continue affordance 536. In response to detecting the user input 509, the old device 504 displays a connection status user interface 538 overlaid on the wake screen user interface 516 in FIG. 5D, which indicates that the old device 504 is attempting to establish a connection with the new device 502.

After the connection is established between the new device 502 and the old device 504, the new device 502 displays a first authentication user interface 540 in FIG. 5E. According to some embodiments, the first authentication user interface 540 includes a pattern 541 (e.g., a QR code, encoded pattern, unique pattern, unique geometric shape, or the like) and the manual set-up affordance 532, which, when selected (e.g., with a left-to-right swipe gesture thereover), causes the new device 502 to abort the proximity-based authentication bootstrapping process.

After the connection is established between the new device 502 and the old device 504, the old device 504 displays an image capture user interface 542 overlaid on the wake screen user interface 516 in FIG. 5E. According to some embodiments, the image capture user interface 542 instructs a user to position the pattern 541 displayed by the new device 502 within a target window 543 in order to capture an image of the pattern 541 with the image sensor of the old device 504. According to some embodiments, the image capture user interface 542 also includes a manual authentication affordance 544, which, when selected (e.g., with a single or double tap gesture), causes the old device 504 to abort the proximity-based authentication bootstrapping process. As shown in FIG. 5E, the pattern 541 is currently within the target window 543. In some embodiments, the old device 504 automatically captures an image that includes the pattern 541 once the pattern 541 is detected within the target window 543. In some embodiments, the old device 504 captures an image that includes the pattern 541 in response to a user input (e.g., actuation of a physical button, a voice command, an input gesture, or the like).

After capturing the image of the pattern 541, the old device 504 optionally re-displays the connection status user interface 538 overlaid on the wake screen user interface 516 in FIG. 5F. After validating the pattern 541, the old device 504 displays a bootstrapping status user interface 552 in FIG. 5G instructing the user to finish the new device set-up workflow on the new device 502. After the old device 504 validates the pattern 541, the old device 504 provides authentication credentials to the new device 502. However, in order to use the authentication credentials, the new device 502 displays the second authentication user interface 550 in FIG. 5G, which instructs the user to enter the passcode of the old device 504 via the software keyboard 556. According to some embodiments, the second authentication user interface 550 includes a "forgot passcode" affordance 554, which, when selected (e.g., with a single or double tap gesture), causes the new device 502 to display a passcode recovery user interface.

FIG. 5H-5L show a sequence in which a device-to-device (D2D) direct transfer is used to transfer pre-existing data from the old device 504 to the new device 502 in accordance with some embodiments. After completing the proximity-based authentication bootstrapping process in FIGS. 5C-5G, the new device 502 displays a data migration initiation user interface 560 in FIG. 5H. According to some embodiments, the data migration initiation user interface 560 includes a "start transfer" affordance 562, which, when selected (e.g., with a single or double tap gesture), causes the new device 502 to display a data migration user interface 570 (e.g., as shown by the sequence in FIGS. 5H and 5I). According to some embodiments, the data migration initiation user interface 560 also includes an "other options" affordance 564, which, when selected (e.g., with a single or double tap gesture), causes the new device 502 to display other options for setting-up the new device 502 such as setting-up the new device 502 as a "fresh device" without migrating data from another source (e.g., the old device 504 or a remote source storing a back-up).

As shown in FIG. 5H, the new device 502 detects a user input 521 (e.g., a single or double tap gesture) at a location that corresponds to the "start transfer" affordance 562. In response to detecting the user input 521, the new device 502 displays a data migration user interface 570 in FIG. 5I. According to some embodiments, the data migration user interface 570 includes: a selectable direct transfer option 572, which, when selected (e.g., with a single or double tap gesture), causes the new device 502 to initiate a direct transfer of data to the new device 502 from the old device 504; and a selectable remote transfer option 574, which, when selected (e.g., with a single or double tap gesture), causes the new device 502 to initiate a remote transfer of data to the new device 502 from a remote source such as a file server or cloud-hosted back-up. According to some embodiments, the data migration user interface 570 also includes an estimated time for completion of the direct transfer (e.g., 35 minutes) within the selectable direct transfer option 572 and an estimated time for completion of the remote transfer (e.g., 45 minutes) within the selectable remote transfer option 574. According to some embodiments, the data migration user interface 570 also includes the "other options" affordance 564, which, when selected (e.g., with a single or double tap gesture), causes the new device 502 to display other options for setting-up the new device 502 such as setting-up the new device 502 as a "fresh device" without migrating data from another source (e.g., the old device 504 or a remote source storing a back-up).

In some embodiments, when an age of a back-up stored by the remote source is greater than a threshold temporal length (e.g., greater than X days old), the new device 502 displays the selectable direct transfer option 572 with an emphatic appearance in order to recommend the direct transfer over the remote transfer. According to some embodiments, the emphatic appearance corresponds to additional text, icon, image, and/or the like suggesting that the user select the direct transfer option. In some embodiments, the emphatic appearance for the direct transfer option corresponds to a different text or background appearance as compared to a default appearance for the remote transfer option such as a larger font size, all capital letters, emphatic typeface, colored text, blinking/flashing background, colored background, and/or the like.

In some embodiments, when an age of a back-up stored by the remote source is less than the threshold temporal length (e.g., less than X days old), the new device 502 displays the selectable remote transfer option 574 with an emphatic appearance in order to recommend the remote transfer over the direct transfer. According to some embodiments, the emphatic appearance corresponds to additional text, icon, image, and/or the like suggesting that the user select the remote transfer option. In some embodiments, the emphatic appearance for the remote transfer option corresponds to a different text or background appearance as compared to a default appearance for the direct transfer option such as a larger font size, all capital letters, emphatic typeface, colored text, blinking/flashing background, colored background, and/or the like. In some embodiments, the new device 502 displays both the selectable direct transfer option 572 and the selectable remote transfer option 574 with a default appearance.

In some embodiments, the data migration user interface 570 does not include the selectable direct transfer option 572 when a local wireless communication link cannot be established between the new device 502 and the old device 504. In some embodiments, the data migration user interface 570 does not include the selectable remote transfer option 574 when the remote source is unreachable/unavailable or a back-up is not stored by the remote source.

As shown in FIG. 5I, the new device 502 detects a user input 523 (e.g., a single or double tap gesture) at a location that corresponds to the selectable direct transfer option 572. In response to detecting the user input 523, the new device 502 initiates the direct transfer of data to the new device 502 from the old device 504 and also displays a direct transfer user interface 571 in FIG. 5J. In response to detecting the user input 523, the new device 502 causes the old device 504 to display a direct transfer status interface 582 overlaid on the wake screen user interface 516 in FIG. 5J. According to some embodiments, a local wireless communication link is established between the new device 502 and the old device 504 via Wi-Fi, BLUETOOTH, ZIGBEE, NFC, or the like to complete the direct transfer. According to some embodiments, during the direct transfer, the new device 503 obtains (e.g., receives or retrieves) pre-existing data stored by the old device 504 such as settings, notes, messages, contacts, application data, media (e.g., photos, videos, and music), and/or the like.

According to some embodiments, the direct transfer user interface 571 includes a time remaining indicator (e.g., 10 minutes) and a cancel affordance, 573, which, when selected (e.g., with a single or double tap gesture), causes the new device 502 to abort the direct transfer. According to some embodiments, the direct transfer status interface 582 includes a time remaining indicator (e.g., 10 minutes) and a cancel affordance, 584, which, when selected (e.g., with a single or double tap gesture), causes the old device 504 to abort the direct transfer.

As shown in FIG. 5K, in response to detecting an error with the direct transfer, the new device 502 displays an error alert user interface 580. According to some embodiments, the error alert user interface 580 includes a restart affordance 586, which, when selected (e.g., with a single or double tap gesture), causes the new device 502 to restart the direct transfer between the new device 502 and the old device 504. In some embodiments, the new device 502 detects an error with the direct transfer when a disconnection or other issue occurs with the local wireless communication link between the new device 502 and the old device 504. In some embodiments, the new device 502 detects an error with the direct transfer when a received signal strength from the old device 504 breaches a predefined threshold such as Z dBm indicating that the new device 502 and the old device 504 are out of proximity range. In some embodiments, the new device 502 detects an error with the direct transfer when the new device 502 obtains corrupted data from the old device 504.

In response to detecting completion of the direct transfer, the new device 502 displays a direct transfer completion user interface 590 in FIG. 5L. According to some embodiments, the direct transfer completion user interface 590 includes instructions to continue the new device set-up workflow and also a continue affordance 592, which, when selected (e.g., with a single or double tap gesture), causes the new device 502 to display a next user interface associated with the new device set-up workflow.

In response to detecting completion of the direct transfer, the new device 502 causes the old device 504 to display a direct transfer completion user interface 594 overlaid on the wake screen user interface 516 in FIG. 5L. According to some embodiments, the direct transfer completion user interface 594 includes instructions to secure erase and/or recycle/return the old device 504. As shown in FIG. 5L, the direct transfer completion user interface 594 includes a secure erase affordance 596, which, when selected (e.g., with a single or double tap gesture), causes the old device 504 to securely erase its memory or local storage device. As shown in FIG. 5L, the direct transfer completion user interface 594 also includes a cancel affordance 598, which, when selected (e.g., with a single or double tap gesture), causes the old device 504 to dismiss the direct transfer completion user interface 594.

FIGS. 5M and 5N show a sequence in which a D2D direct transfer is used to transfer data from the old device 504 to the new device 502 in accordance with some embodiments. If the proximity-based authentication bootstrapping process in FIGS. 5C-5G was canceled or otherwise not completed/performed, the new device 502 displays a data restoration user interface 5100 in FIG. 5M following the region selection user interface 522 in FIG. 5B. According to some embodiments, the data restoration user interface 5100 includes selectable options 5102A, 5102B, and 5102C for restoring and/or moving applications and data to the new device 502. In some embodiments, the selectable option 5102A corresponds to a direct transfer of data from the old device 504 to the new device 502, which, when selected, causes the new device 502 to initiate the direct transfer. In some embodiments, the selectable option 5102B corresponds to a first option to transfer data from a first remote source to the new device 502, which, when selected, causes the new device 502 to initiate a first remote transfer. In some embodiments, the selectable option 5102C corresponds to second first option to transfer data from a second remote source to the new device 502, which, when selected, causes the new device 502 to initiate a second remote transfer.

As shown in Figure M, the new device 502 detects a user input 525 (e.g., a single or double tap gesture) at a location that corresponds to the selectable option 5102A. In response to detecting the user input 525, the new device 502 displays a direct transfer initiation user interface 5110 in FIG. 5N. According to some embodiments, the direct transfer user initiation interface 5110 includes instructions for initiating the direct transfer and also the manual set-up affordance 532.

In response to detecting the user input 525, the new device 502 causes the old device 504 to display a direct transfer prompt user interface 5112 in FIG. 5N. According to some embodiments, the direct transfer prompt user interface 5112 includes a continue affordance 5114, which, when selected (e.g., with a single or double tap gesture), causes the old device 504 to establish a local wireless communication link with the new device 502 in order to perform the direct transfer.

FIGS. 6A and 6B illustrate a flow diagram of a method 600 of presenting a data migration user interface with selectable direct transfer (D2D) and remote transfer (cloud server) options in accordance with some embodiments. The method 600 is performed at a first device (e.g., the portable multifunction device 100 in FIG. 1A, or the device 300 in FIG. 3) with a one or more processors, non-transitory memory, a display device, and one or more input devices. In some embodiments, the display device is a touch-screen display and the one or more input devices are on or integrated with the display. In some embodiments, the display device is separate from the one or more input devices. Some operations in method 600 are, optionally, combined and/or the order of some operations is, optionally, changed.

As described below, the method 600 provides an intuitive data migration user interface that enables a user to select between direct (D2D) and remote (cloud server) transfer options. The method reduces the cognitive burden on a user when setting-up a new device and also the direct transfer option reduces the amount of time consumed by the new device set-up workflow, thereby creating a more efficient human-machine interface. For battery-operated electronic devices, a faster new device set-up workflow reduces power consumption and increases the time between battery charges.

For example, FIGS. 5A-5N show various user interfaces displayed on both a new device 502 (e.g., the first device) and an old device 504 (e.g., the second device) during a new device set-up workflow in accordance with some embodiments. For example, a user is upgrading or switching from the old device 504 to the new device 502. For example, the new device 502 corresponds to one of a mobile phone, a tablet, a laptop, a wearable computing device, the PMD 100, or the like. For example, the old device 504 corresponds to one of a mobile phone, a tablet, a laptop, a wearable computing device, the PMD 100, or the like.

The device detects (602), via the one or more input devices, a first input that corresponds to migrating data to set-up the first device during a new device set-up workflow. For example, the data corresponds to pre-existing data stored by the second device (e.g., the user's old device) within proximity of the first device or a remote source such as a cloud server or other file server.

As shown in FIG. 5H, the new device 502 detects a user input 521 (e.g., a single or double tap gesture) at a location that corresponds to the "start transfer" affordance 562 within the data migration initiation user interface 560. In response to detecting the user input 521, the new device 502 (e.g., the first device) displays a data migration user interface 570 in FIG. 5I.

In response to detecting the first input, the device displays (604), via the display device, a data migration user interface that includes concurrently displaying: a selectable direct transfer option that corresponds to initiating a direct transfer of the data to the first device from a second device within a predefined proximity range of the first device, wherein the selectable direct transfer option includes an estimated time for completion of the direct transfer; and a selectable remote transfer option that corresponds to initiating a remote transfer of the data to the first device from a remote storage device, wherein the selectable remote transfer option includes an estimated time for completion of the remote transfer. In some embodiments, the (pre-existing) data that is transferred to the first device via the direct transfer option includes user settings, notes, messages, contacts, application data, media content, and/or the like. In some embodiments, the (pre-existing) data that is transferred to the first device via the remote transfer option includes user settings, notes, messages, contacts, application data, media content, and/or the like.

As shown in FIG. 5I, for example, the new device 502 (e.g., the first device) displays the data migration user interface 570. According to some embodiments, the data migration user interface 570 includes: a selectable direct transfer option 572 (e.g., an affordance or button), which, when selected (e.g., with a single or double tap gesture), causes the new device 502 to initiate a direct transfer of data to the new device 502 from the old device 504; and a selectable remote transfer option 574 (e.g., an affordance or button), which, when selected (e.g., with a single or double tap gesture), causes the new device 502 to initiate a remote transfer of data to the new device 502 from a remote source such as a file server or cloud-hosted back-up. According to some embodiments, the data migration user interface 570 also includes an estimated time for completion of the direct transfer (e.g., 35 minutes) within the selectable direct transfer option 572 and an estimated time for completion of the remote transfer (e.g., 45 minutes) within the selectable remote transfer option 574.

Presenting a data migration user interface with direct (D2D) and remote (cloud server) transfer options provides an efficient mechanism for the new device set-up workflow, thus reducing the amount of user interaction to perform the new device set-up workflow. The reduction in user interaction reduces wear-and-tear on the device. The data migration user interface also results in faster completion of the new device set-up workflow and, thus, reduces power drain, which, in turn, increases battery life of the device.

In some embodiments, the selectable remote transfer option is displayed (606) with a respective appearance associated with a recommended option when a back-up associated with the data stored by the remote storage device satisfies a predefined recommendation criterion. In some embodiments, the respective appearance corresponds to additional text, icon, image, and/or the like suggesting that the user select the remote transfer option. In some embodiments, the respective appearance for the remote transfer option corresponds to a different text or background appearance as compared to a default appearance for the direct transfer option such as a larger font size, all capital letters, emphatic typeface, colored text, blinking/flashing background, colored background, and/or the like. In some embodiments, the predefined recommendation criterion is satisfied when the back-up is X or less hours old. In some embodiments, the predefined recommendation criterion is satisfied when the user previously restored data from a remotely stored back-up. For example, with reference to FIG. 5I, when an age of a back-up stored by the remote source is less than the threshold temporal length (e.g., less than M days old), the new device 502 (e.g., the first device) displays the selectable remote transfer option 574 with an emphatic appearance in order to recommend the remote transfer over the direct transfer.

Presenting the selectable remote transfer option within the data migration user interface with the respective appearance steers the user to the remote transfer option in order to provide a faster and more efficient experience during the new device set-up workflow. Furthermore, this reduces the amount of user interaction to perform the new device set-up workflow, which, in turn, reduces wear-and-tear on the device. This also results in faster completion of the new device set-up workflow, which, in turn, reduces power drain and increases battery life of the device.

In some embodiments, the direct and remote transfer options are both displayed with the default appearance when the back-up associated with the data stored by the remote storage device does not satisfy the predefined recommendation criterion. As such, for example, with reference to FIG. 5I, the new device 502 (e.g., the first device) displays both the selectable direct transfer option 572 and the selectable remote transfer option 574 with a default appearance (e.g., black text with a white background).

In some embodiments, the selectable direct transfer option is displayed (608) with a respective appearance associated with a recommended option when a back-up associated with the data is unavailable. In some embodiments, the respective appearance corresponds to additional text, icon, image, and/or the like suggesting that the user select the direct transfer option. In some embodiments, the respective appearance for the direct transfer option corresponds to a different text or background appearance as compared to a default appearance for the remote transfer option such as a larger font size, all capital letters, emphatic typeface, colored text, blinking/flashing background, colored background, and/or the like. For example, with reference to FIG. 5I, when an age of a back-up stored by the remote source is greater than a threshold temporal length (e.g., greater than M days old), the new device 502 displays the selectable direct transfer option 572 with an emphatic appearance in order to recommend the direct transfer over the remote transfer.

Presenting the selectable direct transfer option within the data migration user interface with the respective appearance steers the user to the direct transfer option in order to provide a faster and more efficient experience during the new device set-up workflow. Furthermore, this reduces the amount of user interaction to perform the new device set-up workflow, which, in turn, reduces wear-and-tear on the device. This also results in faster completion of the new device set-up workflow, which, in turn, reduces power drain and increases battery life of the device.

In some embodiments, data migration user interface also includes (610) a selectable set-up option that that corresponds to setting-up the first device without at least some of the data. For example, the aforementioned selectable set-up option corresponds to "fresh set-up" option that causes the new device set-up workflow to continue without user generated content and/or user selected applications associated with the first device. As shown in FIG. 5I, for example, the data migration user interface 570 also includes the "other options" affordance 564, which, when selected (e.g., with a single or double tap gesture), causes the new device 502 to display other options for setting-up the new device 502 such as setting-up the new device 502 as a "fresh device" without migrating data from another source (e.g., the old device 504 or a remote source storing a back-up).

In some embodiments, the data migration user interface includes (612) the selectable direct transfer option when a proximity feature was previously used during the new device set-up workflow. According to some embodiments, the data migration user interface may not include the selectable direct transfer option when the proximity feature was not previously used during the new device set-up workflow. FIGS. 5C-5G illustrate a sequence in which a proximity-based authentication bootstrapping process is used to authenticate a user of the new device 502 with the old device 504 in accordance with some embodiments. After completing the proximity-based authentication bootstrapping process in FIGS. 5C-5G, the new device 502 displays a data migration initiation user interface 560 in FIG. 5H, which leads to the data migration user interface 570 in FIG. 5I. If the proximity-based authentication bootstrapping process in FIGS. 5C-5G was canceled or otherwise not completed/performed, the new device 502 displays a data restoration user interface 5100 in FIG. 5M.

In some embodiments, the data migration user interface includes (614) the selectable direct transfer option when the first device detects the second device. According to some embodiments, the data migration user interface may not include the selectable direct transfer option when the second device is not detected. As one example, the first device detects the second device when the signal strength of a BLUETOOTH, NFC, ZIGBEE, or the like type signal/beacon from the second device breaches a predefined signal strength threshold such as Z dBm. As another example, the first device detects the second device when the first and second devices are connected to a similar wireless network such as a WLAN, PAN, or the like. As yet another example, the first device detects the second device when connected via a wired connection such as serial, USB, COM, CAT-5, etc.

In some embodiments, the data migration user interface includes (616) the selectable remote transfer option when the remote storage device stores a back-up associated with the data. According to some embodiments, the data migration user interface may not include the selectable remote transfer option when the remote storage device does not store a back-up associated with the first device or a user thereof.

In some embodiments, the device (618): detects, via the one or more input devices, a second input that corresponds to selection of the direct transfer option; and, in response to detecting the second input, replaces display of the data migration user interface with a direct transfer user interface via the display device that includes an estimated time for completion of the direct transfer and a selectable option to cancel the direct transfer. As shown in FIG. 5I, the new device 502 detects a user input 523 (e.g., a single or double tap gesture) at a location that corresponds to the selectable direct transfer option 572. In response to detecting the user input 523, the new device 502 (e.g., the first device) initiates the direct transfer of data to the new device 502 from the old device 504 (e.g., the second device). According to some embodiments, a local wireless communication link is established between the new device 502 and the old device 504 via Wi-Fi, BLUETOOTH, ZIGBEE, NFC, or the like to complete the direct transfer. According to some embodiments, during the direct transfer, the new device 503 obtains (e.g., receives or retrieves) pre-existing data stored by the old device 504 such as settings, notes, messages, contacts, application data, media (e.g., photos, videos, and music), and/or the like In response to detecting the user input 523, the new device 502 (e.g., the first device) also displays a direct transfer user interface 571 in FIG. 5J. According to some embodiments, the direct transfer user interface 571 includes a time remaining indicator or estimated time for completion (e.g., 10 minutes) and a cancel affordance 573, which, when selected (e.g., with a single or double tap gesture), causes the new device 502 to abort the direct transfer. In some embodiments, the estimated time for completion is updated over time (e.g., as the direct transfer progresses or a rate of data transfer increases or decreases).

Presenting the direct transfer user interface provides an efficient mechanism for the new device set-up workflow that indicates the status of the direct transfer and reduces user confusion. This provides more efficient experience during the new device set-up workflow that reduces the amount of user interaction to perform the new device set-up workflow, which, in turn, reduces wear-and-tear on the device.

In some embodiments, while displaying the direct transfer user interface, the device (620): obtains a first portion of the data from the second device via a first communication channel; and obtains a second portion of the data from the remote storage device via a second communication channel. In some embodiments, the first communication channel corresponds to local wireless communication link between the new device 502 and the old device 504 via Wi-Fi, BLUETOOTH, ZIGBEE, NFC, or the like. In some embodiments, the second communication channel corresponds to wired or wireless communication link between the new device 502 and the remote storage device via a WAN, LAN, MAN, or the like. For example, the first portion of the data includes contacts, settings, app data, some media (photos, videos, music), and/or the like. For example, the second portion of the data includes some media (photos, videos, music), app binaries, and/or the like. In some embodiments, there is no overlap between the first and second portions of the data. In some embodiments, there is some overlap between the first and second portions of the data. Obtaining the data via first and second communication channels results in faster completion of the new device set-up workflow and, thus, reduces power drain, which, in turn, increases battery life of the device.

In some embodiments, the device (622): while displaying the direct transfer user interface, detects movement of the first device relative to the second device; in response to detecting the movement of the first device relative to the second device and in accordance with a determination that the first device has reached a threshold distance from the second device, displays, via the display device, a proximity warning indicator; and in response to detecting the movement of the first device relative to the second device and in accordance with a determination that the first device has not reached the threshold distance from the second device, forgoes displaying, via the display device, of the proximity warning indicator. For example, the threshold distance corresponds to a distance that is approaching the edge of the proximity range for communication between the first device and the second device. In some embodiments, the device optionally determines whether or not the first device is nearby an edge of a proximity range relative to the second device. For example, the first device determines that it is nearby the edge of the proximity range when the received signal strength from the second device breaches a predefined threshold such as Y dBm. Presenting the proximity warning indicator provides an efficient mechanism for the new device set-up workflow that indicates a potential obstacle to completion of the direct transfer and reduces user confusion. This provides more efficient experience during the new device set-up workflow that reduces the amount of user interaction to perform the new device set-up workflow, which, in turn, reduces wear-and-tear on the device.

For example, as shown in FIG. 5K, in response to detecting an error with the direct transfer, the new device 502 (e.g., the first device) displays an error alert user interface 580. According to some embodiments, the error alert user interface 580 includes a restart affordance 586, which, when selected (e.g., with a single or double tap gesture), causes the new device 502 to restart the direct transfer between the new device 502 and the old device 504. In some embodiments, the new device 502 detects an error with the direct transfer when a disconnection or other issue occurs with the local wireless communication link between the new device 502 and the old device 504. In some embodiments, the new device 502 detects an error with the direct transfer when a received signal strength from the old device 504 breaches a predefined threshold such as Z dBm indicating that the new device 502 and the old device 504 are out of proximity range. In some embodiments, the new device 502 detects an error with the direct transfer when the new device 502 obtains corrupted data from the old device 504.

In some embodiments, the device (624): while displaying the direct transfer user interface, determines that the direct transfer is complete; and, in response to determining that the direct transfer is complete, causes the second device to display an option to securely erase the second device. In some embodiments, the second device also displays instructions for return/recycling of the second device. Presenting the secure erase option provides an efficient mechanism for discarding the old device (e.g., the second device) that improves data security and reduces user confusion. This provides a more efficient experience during the new device set-up workflow that reduces the risk of a breach of the user's data.

For example, in response to detecting completion of the direct transfer, the new device 502 (e.g., the first device) displays a direct transfer completion user interface 590 in FIG. 5L. According to some embodiments, the direct transfer completion user interface 590 includes instructions to continue the new device set-up workflow and also a continue affordance 592, which, when selected (e.g., with a single or double tap gesture), causes the new device 502 to display a next user interface associated with the new device set-up workflow.

For example, in response to detecting completion of the direct transfer, the new device 502 (e.g., the first device) causes the old device 504 (e.g., the second device) to display a direct transfer completion user interface 594 overlaid on the wake screen user interface 516 in FIG. 5L. According to some embodiments, the direct transfer completion user interface 594 includes instructions to secure erase and/or recycle/return the old device 504. As shown in FIG. 5L, the direct transfer completion user interface 594 includes a secure erase affordance 596, which, when selected (e.g., with a single or double tap gesture), causes the old device 504 to securely erase its memory. As shown in FIG. 5L, the direct transfer completion user interface 594 also includes a cancel affordance 598, which, when selected (e.g., with a single or double tap gesture), causes the old device 504 to dismiss the direct transfer completion user interface 594.

It should be understood that the particular order in which the operations in FIGS. 6A and 6B have been described is merely example and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general-purpose processors (e.g., as described with respect to FIGS. 1A, 3, and 5A) or application specific chips. Further, the operations described above with reference to FIGS. 6A and 6B, optionally, implemented by components depicted in FIGS. 1A and 1B. For example, the user inputs, user interfaces, and selectable options are, optionally, implemented by the event sorter 170, the event recognizer 180, and the event handler 190. The event monitor 171 in the event sorter 170 detects a contact on the touch-sensitive surface 451, and the event dispatcher module 174 delivers the event information to the application 136-1. A respective event recognizer 180 of the application 136-1 compares the event information to respective event definitions 186 and determines whether a first contact at a first location on the touch-sensitive surface corresponds to a predefined event or sub-event, such as selection of an object on a user interface. When a respective predefined event or sub-event is detected, the event recognizer 180 activates an event handler 190 associated with the detection of the event or sub-event. The event handler 190 optionally utilizes or calls the data updater 176 or the object updater 177 to update the application internal state 192. In some embodiments, the event handler 190 accesses a respective GUI updater 178 to update what is displayed by the application. Similarly, it would be clear to a person having ordinary skill in the art how other processes can be implemented based on the components depicted in FIGS. 1A and 1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at a first device including a display device, one or more input devices, non-transitory memory, and one or more processors coupled with the non-transitory memory:

detecting, via the one or more input devices, a first input that corresponds to migrating data to set-up the first device during a new device set-up workflow;

in response to detecting the first input, displaying, via the display device, a data migration user interface that includes concurrently displaying:

a selectable direct transfer option that corresponds to initiating a direct transfer of the data to the first device from a second device within a predefined proximity range of the first device, wherein the selectable direct transfer option includes an estimated time for completion of the direct transfer; and a selectable remote transfer option that corresponds to initiating a remote transfer of the data to the first device from a remote storage device different from the second device, wherein the selectable remote transfer option includes an estimated time for completion of the remote transfer;

while displaying the data migration user interface, detecting, via the one or more input devices, a second input directed to one of the selectable remote transfer option or the selectable remote transfer option within the data migration user interface; and in response to detecting the second input via the one or more input devices:

in accordance with a determination that the second input is directed to the selectable direct transfer option within the data migration user interface, initiating a process for causing the data to be transferred to the first device from the second device within the predefined proximity range of the first device; and in accordance with a determination that the second input is directed to the selectable remote transfer option within the data migration user interface, initiating a process for causing the data to be transferred to the first device from the remote storage device.

2. The method of claim 1, wherein the selectable remote transfer option is displayed with a respective appearance associated with a recommended option when a backup associated with the data stored by the remote storage device satisfies a predefined recommendation criterion.

3. The method of claim 1, wherein the selectable direct transfer option is displayed with a respective appearance associated with a recommended option when a backup associated with the data is unavailable.

4. The method of claim 1, wherein the data migration user interface also includes a selectable set-up option that that corresponds to setting-up the first device without at least some of the data.

5. The method of claim 1, further comprising:

detecting, via the one or more input devices, a second input that corresponds to selection of the direct transfer option; and in response to detecting the second input, replacing display of the data migration user interface with a direct transfer user interface via the display device that includes an estimated time for completion of the direct transfer and a selectable option to cancel the direct transfer.

6. The method of claim 5, further comprising:

while displaying the direct transfer user interface, detecting movement of the first device relative to the second device;

in response to detecting the movement of the first device relative to the second device and in accordance with a determination that the first device has reached a threshold distance from the second device, displaying, via the display device, a proximity warning indicator; and in response to detecting the movement of the first device relative to the second device and in accordance with a determination that the first device has not reached the threshold distance from the second device, forgoing displaying, via the display device, of the proximity warning indicator.

7. The method of claim 5, further comprising:

while displaying the direct transfer user interface:

obtaining a first portion of the data from the second device via a first communication channel; and obtaining a second portion of the data from the remote storage device via a second communication channel.

8. The method of claim 5, further comprising:

while displaying the direct transfer user interface, determining that the direct transfer is complete; and in response to determining that the direct transfer is complete, causing the second device to display an option to securely erase the second device.

9. The method of claim 1, wherein the data migration user interface includes the selectable direct transfer option when a proximity feature was previously used during the new device set-up workflow.

10. The method of claim 1, wherein the data migration user interface includes the selectable direct transfer option when the first device detects the second device.

11. The method of claim 1, wherein the data migration user interface includes the selectable remote transfer option when the remote storage device stores a backup associated with the data.

12. An electronic device, comprising:

a display device;

one or more input devices;

one or more processors;

non-transitory memory; and one or more programs, wherein the one or more programs are stored in the non-transitory memory and configured to be executed by the one or more processors, the one or more programs including instructions for:

detecting, via the one or more input devices, a first input that corresponds to migrating data to set-up the electronic device during a new device set-up workflow;

in response to detecting the first input, displaying, via the display device, a data migration user interface that includes concurrently displaying:

a selectable direct transfer option that corresponds to initiating a direct transfer of the data to the electronic device from a second device within a predefined proximity range of the electronic device, wherein the selectable direct transfer option includes an estimated time for completion of the direct transfer; and a selectable remote transfer option that corresponds to initiating a remote transfer of the data to the electronic device from a remote storage device different from the second device, wherein the selectable remote transfer option includes an estimated time for completion of the remote transfer;

while displaying the data migration user interface, detecting, via the one or more input devices, a second input directed to one of the selectable remote transfer option or the selectable remote transfer option within the data migration user interface; and in response to detecting the second input via the one or more input devices:

in accordance with a determination that the second input is directed to the selectable direct transfer option within the data migration user interface, initiating a process for causing the data to be transferred to the first device from the second device within the predefined proximity range of the first device; and in accordance with a determination that the second input is directed to the selectable remote transfer option within the data migration user interface, initiating a process for causing the data to be transferred to the first device from the remote storage device.

13. The electronic device of claim 12, wherein the selectable remote transfer option is displayed with a respective appearance associated with a recommended option when a backup associated with the data stored by the remote storage device satisfies a predefined recommendation criterion.

14. The electronic device of claim 12, wherein the selectable direct transfer option is displayed with a respective appearance associated with a recommended option when a backup associated with the data is unavailable.

15. The electronic device of claim 12, wherein the data migration user interface also includes a selectable set-up option that that corresponds to setting-up the electronic device without at least some of the data.

16. The electronic device of claim 12, wherein the one or more programs further include instructions for:

detecting, via the one or more input devices, a second input that corresponds to selection of the direct transfer option; and in response to detecting the second input, replacing display of the data migration user interface with a direct transfer user interface via the display device that includes an estimated time for completion of the direct transfer and a selectable option to cancel the direct transfer.

17. A non-transitory computer readable storage medium storing one or more programs, the one or more programs comprising instructions, which, when executed by an electronic device with a display device, and one or more input devices, cause the electronic device to:

detect, via the one or more input devices, a first input that corresponds to migrating data to set-up the electronic device during a new device set-up workflow;

in response to detecting the first input, display, via the display device, a data migration user interface that includes concurrently displaying:

a selectable direct transfer option that corresponds to initiating a direct transfer of the data to the electronic device from a second device within a predefined proximity range of the electronic device, wherein the selectable direct transfer option includes an estimated time for completion of the direct transfer; and a selectable remote transfer option that corresponds to initiating a remote transfer of the data to the electronic device from a remote storage device different from the second device, wherein the selectable remote transfer option includes an estimated time for completion of the remote transfer;

while displaying the data migration user interface, detect, via the one or more input devices, a second input directed to one of the selectable remote transfer option or the selectable remote transfer option within the data migration user interface; and in response to detecting the second input via the one or more input devices:

in accordance with a determination that the second input is directed to the selectable direct transfer option within the data migration user interface, initiate a process for causing the data to be transferred to the first device from the second device within the predefined proximity range of the first device; and in accordance with a determination that the second input is directed to the selectable remote transfer option within the data migration user interface, initiate a process for causing the data to be transferred to the first device from the remote storage device.

18. The non-transitory computer readable storage medium of claim 17, wherein the selectable remote transfer option is displayed with a respective appearance associated with a recommended option when a backup associated with the data stored by the remote storage device satisfies a predefined recommendation criterion.

19. The non-transitory computer readable storage medium of claim 17, wherein the selectable direct transfer option is displayed with a respective appearance associated with a recommended option when a backup associated with the data is unavailable.

20. The non-transitory computer readable storage medium of claim 17, wherein the data migration user interface also includes a selectable set-up option that that corresponds to setting-up the electronic device without at least some of the data.

21. The non-transitory computer readable storage medium of claim 17, wherein the instructions further cause the electronic device to:

detect, via the one or more input devices, a second input that corresponds to selection of the direct transfer option; and in response to detecting the second input, replace display of the data migration user interface with a direct transfer user interface via the display device that includes an estimated time for completion of the direct transfer and a selectable option to cancel the direct transfer.

22. The method of claim 1, further comprising:

after receiving the data from the second device within the predefined proximity range of the first device, setting up the first device to complete the new device set-up workflow for the first device; and after receiving the data from the remote storage device, setting up the first device to complete the new device set-up workflow for the first device.

* * * * *